United States Patent
Heinzman et al.

(10) Patent No.: US 6,559,243 B1
(45) Date of Patent: May 6, 2003

(54) GLYOXYLIC COMPOUND COMPRISING ONE OR MORE ACTIVE INGREDIENT

(75) Inventors: Stephen Wayne Heinzman, Whitley Bay (GB); Simon Timothy Farrington Sawyer, Newcastle upon Tyne (GB); Robert J. Strife, Fairfield, OH (US); Arnaud Pierre Struillou, Newcastle u. Tyne (GB)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/509,906

(22) PCT Filed: Oct. 3, 1997

(86) PCT No.: PCT/US97/17933

§ 371 (c)(1), (2), (4) Date: Feb. 8, 2001

(87) PCT Pub. No.: WO99/16804

PCT Pub. Date: Apr. 8, 1999

(30) Foreign Application Priority Data

Oct. 1, 1997 (WO) ............................. PCT/US97/17835

(51) Int. Cl.[7] ........................... C08G 2/30; C07C 66/675
(52) U.S. Cl. ...................... 525/398; 525/473; 560/180; 560/182; 562/583
(58) Field of Search .................... 525/398, 473; 560/180, 182; 562/583

(56) References Cited

U.S. PATENT DOCUMENTS 4,204,052 A * 5/1980 Crutchfield ................. 525/398

* cited by examiner

Primary Examiner—Patricia A. Short
(74) Attorney, Agent, or Firm—James F. McBride; Kim W. Zerby; Steven W. Miller

(57) ABSTRACT

The present invention relates to glyoxylic compound comprising one or more active ingredient. By the present invention, a delayed release of the active ingredient is provided upon contact of the compound with an aqueous medium.

8 Claims, No Drawings

GLYOXYLIC COMPOUND COMPRISING ONE OR MORE ACTIVE INGREDIENT

FIELD OF THE INVENTION

The present invention relates to glyoxylic compounds comprising one or more active ingredient, in particular alcohol or mixed alcohol/aldehyde ingredients. More particularly, it relates to glyoxylic compound comprising one or more active ingredient for use in laundry and cleaning products.

BACKGROUND OF THE INVENTION

Cleaning and laundry products are well-known in the art. However, consumer acceptance of laundry and cleaning products is determined not only by the performance achieved with these products but also the aesthetics associated therewith. The perfume components are therefore an important aspect of the successful formulation of such commercial products.

It is also desired by consumers for laundered fabrics to maintain the pleasing fragrance over time. Indeed, perfume additives make laundry compositions more aesthetically pleasing to the consumer, and in some cases the perfume imparts a pleasant fragrance to fabrics treated therewith. However, the amount of perfume carry-over from an aqueous laundry bath onto fabrics is often marginal and does not last long on the fabric. Furthermore, fragrance materials are often very costly and their inefficient use in laundry and cleaning compositions and ineffective delivery to fabrics result in a very high cost to both consumers and laundry and cleaning manufacturers. Industry, therefore, continues to seek with urgency for more efficient and effective fragrance delivery in laundry and cleaning products, especially for improvement in the provision of long-lasting fragrance to the fabrics.

One solution is to use carrier mechanisms for perfume delivery, such as by encapsulation. This is taught in the prior art and described in U.S. Pat. No. 5,188,753. Still another solution is to formulate compounds which provide a delayed release of the perfume over a longer period of time than by the use of the perfume itself have been provided. Disclosure of such compounds may be found in WO 95/04809, WO 95/08976 and pending application EP 95303762.9.

However, notwithstanding the advances in the art, there is still a need for a compound which provides a delayed release of the perfume component.

The Applicant has now found that glyoxylic compounds comprising one or more active alcohols also provide a delayed release of the active such as a perfume.

Another advantage of the invention is that these glyoxylic compound can suitably be copolymerised with a monomeric unit, of which an active aldehydic monomeric unit can suitably be used including those useful in perfumery. When active aldehyde monomeric unit are used, this results in a glyoxylic compound comprising mixed active alcohol/aldehyde group, which in turn results in the release of their respective group, i.e. active alcohol group and active aldehyde group.

Still another advantage of the present invention is that the glyoxylic compound comprising one or more of these active ingredients, i.e. active alcohols or mixed active alcohol/aldehyde provides sufficient stabilisation of the linkage bond between the active alcohol and/or aldehyde group with its carrier so that the release of the active ingredients upon storage in product is limited, without hindering the release of the active ingredients upon use of the product.

Still another advantage of the invention compounds is their ease of manufacture rendering their use most desirable.

SUMMARY OF THE INVENTION

The present invention relates to a glyoxylic compound comprising one or more active ingredient, wherein said compound has the following empirical formula:

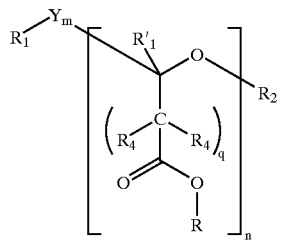

wherein at least one of R or R2 is an organic chain of an active alcohol and the other (R and/or R2) is selected from hydrogen, alkali metals, ammonium, alkyl, alkenyl, aryl, alkylaryl, organic chain of an active alcohol, or any other chain containing at least 1 carbon atom, and wherein each of R1, R'1 are each independently selected from hydrogen, hydroxyl, alkyl, alkenyl, aryl, alkylaryl, COOR3, $(CR_4R_4)_q$COOR3, OR3, or any other chain containing at least 1 carbon atom;

wherein R3 is selected from hydrogen, alkali metals, ammonium, alkyl, alkenyl, aryl, alkylaryl, organic chain of an active alcohol, or any other chain containing at least 1 carbon atom, wherein R4 are each independently selected from hydrogen, hydroxyl, alkyl, alkenyl, aryl, alkylaryl, COOR3, $CH_2$COOR3, OR3, or any other chain containing at least 1 carbon atom;

wherein Y is a comonomeric unit, wherein m is an integer of value from 0 to 10000, preferably from 0 to 1000 and more preferably between 0 and 100, and wherein n is an integer of value of at least 1, preferably less than 1000 and more preferably less than 100;

wherein q is an integer of value from 0 to 10, preferably from 0 to 4 and more preferably 0.

In another aspect of the invention, there is provided a laundry and cleaning composition or personal cleansing composition comprising said compound.

Still another aspect of the invention is a method of delivering residual fragrance to a surface which comprises the steps of contacting said surface with a compound of the invention or a composition comprising said compound in presence of material so that at least one of the oxygen bearing perfume is hydrolysed.

Detailed Description of the Invention

The essential component of the invention is a compound derived from glyoxylic acid. The compound of the invention has the following empirical formula:

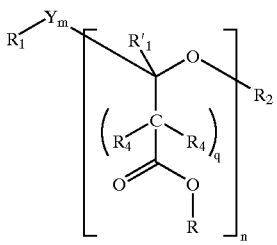

wherein at least one of R or R2 is an organic chain of an active alcohol and the other (R and/or R2) is selected from hydrogen, alkali metals, ammonium, alkyl, alkenyl, aryl, alkylaryl, organic chain of an active alcohol, or any other chain containing at least 1 carbon atom, and wherein each of R1, R'1 are each independently selected from hydrogen, hydroxyl, alkyl, alkenyl, aryl, alkylaryl, COOR3, $(CR_4R_4)_q$COOR3, OR3, or any other chain containing at least 1 carbon atom;

wherein R3 is selected from hydrogen alkali metals, ammonium, alkyl, alkylene, aryl, alkylaryl, organic chain of an active alcohol, or any other chain containing at least 1 carbon atom, wherein R4 are each independently selected from hydrogen, hydroxyl, alkyl, alkenyl, aryl, alkylaryl, COOR3, $CH_2$COOR3, OR3, or any other chain containing at least 1 carbon atom;

wherein Y is a comonomeric unit, wherein m is an integer of value from 0 to 10000, preferably from 0 to 1000 and more preferably between 0 and 100, and wherein n is an integer of value of at least 1, preferably less than 1000 and more preferably less than 100;

wherein q is an integer of value from 0 to 10, preferably from 0 to 4 and more preferably 0.

By alkyl and alkenyl chain, it is understood a chain length of at least 1 carbon, preferably 1 to 20 carbon atoms, and more preferably is methyl or ethyl. Of course, it is also understood that the chain and cycles can be optionally substituted or interrupted. Typical of such substitution is a short alkyl chain such as methyl, ethyl, or hydroxy group. Typical of such interruption is with an O, N, CO, OC(O), CO(O), C(O)N, NC(O) and mixtures thereof.

By "co-monomeric unit", it is meant any suitable comonomer which can be copolymerised with the glyoxylic monomeric unit. Typical of such comonomers are those having at least two reactive sites and which do not inhibit the polymerisation or cause the copolymer to depolymerise in alkaline solution. Preferably, these monomeric units are selected from epoxy compounds such as ethylene oxide, propylene oxide, epihalohydrin epoxysuccinate and the like; aldehydes such as formaldehyde, acetaldehyde, active aldehyde such as those commonly used in perfumery including octanal, decanal, dodecanal, methylnonyl acetaldehyde, benzaldehyde as well as aldehydes containing up to 20 carbon atoms. Preferred among the one above disclosed are the active aldehyde commonly used in perfumery which then result in the release of either a mixed active alcohol compound and an aldehydic perfume compound or even most preferred a mixed perfume fragrance of alcohol(s) and aldehyde(s).

For ease of purpose, the copolymer has been schematised under its empirical formula as a block copolymer. However, it will be obvious for those skilled in the art that, in general, by copolymerisation of two or more different monomers, the copolymer obtained generally show a completely random distribution of the monomers along the backbone of the polymer rather than the block distribution represented above. Any combination possible of the different monomers in the copolymer will not affect the overall controlled release benefit observed with such copolymer and are therefore included in the present description.

A preferred compound among the one described in the above formula are compounds wherein n is equal to 1 and wherein m and q are equal to 0. Such compounds which allow the controlled release of one or more active alcohols have the following formula:

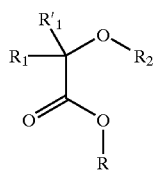

wherein R, R1, R'1, and R2 is as defined hereinbefore.

Preferred compounds for which n is 1 when m and q are 0 are compounds derived from the class of glycolic esters and its ethers. The preferred compounds derived from this class of compounds are those wherein R is an organic chain of an active alcohol, R'1 and R1 are hydrogen, and R2 is selected from hydrogen, alkyl, alkenyl, aryl, alkylaryl, organic chain of an active alcohol, and any other chain containing at least 1 carbon atom, preferably is selected from hydrogen, —CH2CH2—(OCH2CH2)$_p$—OCH3, —CH2CH2—(OCH2CH2)$_p$—OH, methyl and ethyl, wherein p is an integer from 0 to 20, preferably from 0 to 6. Preferably, R2 is selected from hydrogen, methyl and ethyl.

Still other preferred compounds for which n is 1 when m and q are 0 are compounds derived from the class of acetals or hemiacetals of glyoxylic esters. The preferred compounds derived from this class are those wherein R1 is OR3 and R'1 is hydrogen, hydroxyl, alkyl, alkenyl, aryl, alkylaryl, COOR3, $(CR_4R_4)$—COOR3, OR3, or any other chain containing at least 1 carbon atom, preferably is selected from hydrogen, —(OCH2CH2)$_{p+1}$—OCH3, —(OCH2CH2)$_{p+1}$—OH, methyl and ethyl, wherein p is an integer from 0 to 20, preferably from 0 to 6. Preferably, R'1 is selected from hydrogen.

Most preferred compounds from the class of acetals or hemiacetals of glyoxylic esters are the dialkoxyacetates of active alcohol wherein R is an organic chain of an active alcohol, R'1 is hydrogen, R1 is OR3, and each R3, R2 is independently selected from hydrogen, alkyl, alkenyl, aryl, alkylaryl, organic chain of an active alcohol, or any other chain containing at least 1 carbon atom.

A preferred type of other chain containing at least 1 carbon atom for dialkoxyacetates of active alcohol compounds is —CH2CH2—(OCH2CH2)$_p$—OCH3 or —CH2CH2—(OCH2CH2)$_p$—OH; wherein p is an integer from 0 to 20, preferably from 0 to 6.

Most preferably, each R3, R2 is independently selected from methyl and ethyl.

Other most preferred compounds from the class of acetals or hemiacetals of glyoxylic esters are the 2-hydroxy-2-activeoxyacetate alkyl ester wherein R2 is an organic chain of an active alcohol, R is selected from hydrogen, alkali metals, ammonium alkyl, alkenyl, aryl group, preferably selected from methyl, and ethyl, more preferably methyl, and R3 is hydrogen.

Still other most preferred compounds from the class of acetals or hemiacetals of glyoxylic esters are the 2-hydroxy-2-activeoxyacetate active ester:

wherein each R and R2 is independently an organic chain of an active alcohol, and wherein R3 is hydrogen.

Another preferred group among the one described in the above general formula of compounds are oligomers and polymers of keto carboxylates $R'_1OC(CR_4R_4)_qCOOR$ polymerized on their own (m=0 and n≧2) or copolymerized with some active aldehyde (m≧1 and n≧1). A preferred group among oligomers and polymers of keto carboxylates described in the above general formula $HOC(CR_4R_4)_q COOR$ are oligomers and polymers of glyoxylic esters polymerized on their own (q=0, m=0 and n≧2) or copolymerized with some active aldehyde (q=0, m≧1 and n≧1).

Preferred oligomers and polymers of keto carboxylates $R'_1OC(CR_4R_4)_qCOOR$ polymerized on their own (m=0 and n≧2) are the compounds wherein n is from to 2 to 10,000. Preferred compounds for which n is from 2 to 10,000 are compounds derived from the class of polyacetals of keto carboxylates $R'_1OC(CR_4R_4)_qCOOR$ of active alcohols and having the following formula:

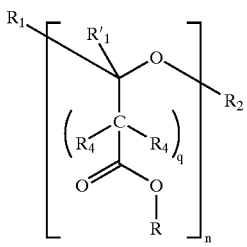

The preferred compounds derived from this class of compounds are those wherein at least one R is the organic chain of an active alcohol, and the other (R and R2) are each independently selected from the organic chain of an active alcohol, hydrogen, alkali metals, ammonium, alkyl, alkylene, aryl, alkylaryl, organic chain of an active alcohol, or any other chain containing at least 1 carbon atom, and wherein R1, R'1 are each independently selected from hydrogen, hydroxyl, alkyl, alkylene, aryl, alkylaryl, COOR3, $(CR_4R_4)_qCOOR3$, OR3, or any other chain containing at least 1 carbon atom;

wherein R3 is selected from hydrogen, alkali metals, ammonium, alkyl, alkylene, aryl, alkylaryl, organic chain of an active alcohol, or any other chain containing at least 1 carbon atom, and wherein R4 are each independently selected from hydrogen, hydroxyl, alkyl, alkylene, aryl, alkylaryl, COOR3, $CH_2COOR3$, OR3, or any other chain containing at least 1 carbon atom;

n is from 2 to 10,000, preferably less than 1000, more preferably less than 100;

q is from 0 to 10, preferably from 0 to 4, more preferably 0, 1 or 2.

R'1 is preferably hydrogen, methyl, ethyl, COOR3.

R4 is preferably hydrogen, methyl, ethyl, phenyl.

R1 is preferably —OCH(CH3)—O—C2H5, —(OCH2CH2)$_{p+1}$—OCH3 or —(OCH2CH2)$_{p+1}$—OH, wherein p is an integer from 0 to 20, preferably from 0 to 6.

For R2 and R3 group above, —CH(CH3)—O—C2H5, —CH2CH2—(OCH2CH2)$_p$—OCH3 or —CH2CH2—(OCH2CH2)$_p$—OH wherein p is an integer from 0 to 20, preferably from 0 to 6 are preferred groups as other chains containing at least 1 carbon.

Among the oligomers and polymers of keto carboxylates, one preferred group is the oligomers and polymers of glyoxylic esters (q=0, m=0 and n≧2) wherein n is from to 2 to 10,000. Preferred compounds for which n is from 2 to 10,000 are compounds derived from the class of polyacetals of glyoxylic esters of active alcohols and have the following formula:

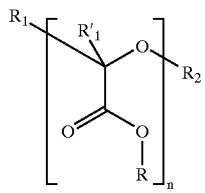

wherein R1, R'1, R2 and R are as defined above for the polyacetals of ketocarboxylates.

Preferably, R'1 is hydrogen.

Preferred oligomers and polymers of keto carboxylates $R'_1OC(CR_4R_4)_qCOOR$ copolymerized with a suitable comonomer (m≧1 and n≧1) are oligomers and polymers of keto carboxylates $R'_1OC(CR_4R_4)_qCOOR$ copolymerized with some active aldehyde, said copolymers having the empirical formula:

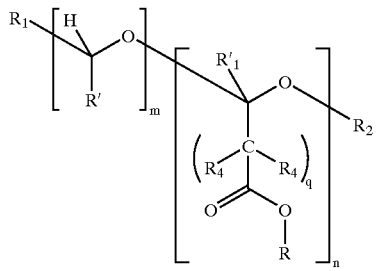

wherein Y is an active aldehyde R'CHO.

Preferably, n and m are independently from 1 to 10000, preferably from 1 to 1000 and more preferably from 1 to 100.

The preferred compounds derived from this class of compounds are those wherein at least one R is the organic chain of an active alcohol, and the other (R and R2) are each independently selected from the organic chain of an active alcohol, hydrogen, alkali metals, ammonium, alkyl alkenyl, aryl, alkylaryl, organic chain of an active alcohol, or any other chain containing at least 1 carbon atom, and wherein R1, R'1 are each independently selected from hydrogen, hydroxyl, alkyl, alkyenyl, aryl, alkylaryl, COOR3, $(CR_4R_4)_qCOOR3$, OR3, or any other chain containing at least 1 carbon atom;

wherein R3 is selected from hydrogen, alkali metals, ammonium, alkyl, alkenyl, aryl, alkylaryl, organic chain of an active alcohol, or any other chain containing at least 1 carbon atom, wherein R4 are each independently selected from hydrogen hydroxyl, alkyl, alkenyl, aryl, alkylaryl, COOR3, $CH_2COOR3$, OR3, or any other chain containing at least 1 carbon atom; and q is from 0 to 10, preferably from 0 to 4, more preferably 0, 1 or 2.

R'1 is preferably hydrogen, methyl, ethyl, COOR3.

R4 is preferably hydrogen, methyl, ethyl, phenyl.

R1 is preferably —OCH(CH3)—O—C2H5, —(OCH2CH2)$_{p+1}$—OCH3 or —(OCH2CH2)$_{p+1}$—OH, wherein p is an integer from 0 to 20, preferably from 0 to 6.

For R2 and R3 group above, —CH(CH3)—O—C2H5, —CH2CH2—(OCH2CH2)$_p$—OCH3 or —CH2CH2—(OCH2CH2)$_p$—OH wherein p is an integer from 0 to 20, preferably from 0 to 6 are preferred groups as other chains containing at least 1 carbon.

Among the preferred oligomers and polymers of keto carboxylates R'$_1$OC(CR$_4$R$_4$)$_q$COOR copolymerized with a suitable comonomer (m≧1 and n≧1), the most preferred are oligomers and polymers of glyoxylic esters copolymerized with some active aldehyde, said copolymers having the empirical formula:

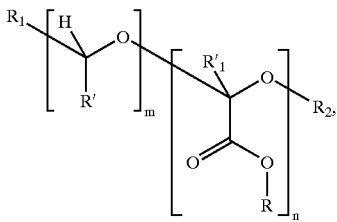

wherein Y is an active aldehyde R'CHO, and wherein R1, R', R'1, R and R2 are as defind above for the copolymers of ketocarboxylates.

Preferably, n and m are independently from 1 to 10000, preferably from 1 to 1000 and more preferably from 1 to 100.

For the above mentioned compounds, by "organic chain" of an active alcohol or an active aldehyde, it is meant any chain containing at least 1 carbon atom, preferably at least 5 carbon atoms. Preferably, the active alcohol or an active aldehyde is respectively selected from a flavour alcohol or aldehyde ingredient, a pharmaceutical alcohol or aldehyde active, a biocontrol alcohol or aldehyde agent, a perfume alcohol or aldehyde component and mixtures thereof. When more than one organic chain of an active alcohol is present on the compound of the invention, each organic chain of an active alcohol can be different from the others, e.g. when there are two organic chain of an active alcohol, one can be a biocontrol alcohol agent and the other a perfume alcohol component, or one organic chain of an active alcohol is a perfume alcohol component and the other organic chain of an active alcohol a different perfume alcohol component. The same applies where the active ingredient is an active aldehyde.

Flavour ingredients include spices, flavor enhancers that contribute to the overall flavour perception.

Pharmaceutical actives include drugs.

Biocontrol agents include biocides, antimicrobials, bactericides, fungicides, algaecides, mildewcides, disinfectants, antiseptics, insecticides, vermicides, plant growth hormones.

Perfume alcohol components include components having odoriferous properties.

Preferably, for the above mentioned compounds, the R group is the organic chain of a perfume alcohol, said alcohol being selected from pentyl-alcohol, pentyl-ortho-hydroxy benzoate, 2-ethyl-4-(2,2,3-trimethylcyclopent-3-enyl)-2-buten-1-ol, cis-3-hexenol, 2-methyl-4-(2,2,3-trimethyl-3-cyclopenten-1-yl)-butanol, 2-norbornane methanol, alpha-3, 3-trimethyl, 2-methyl-5-isopropyl phenol, 3-phenyl-2-propen-1-ol, citronellol (3,7-dimethyl-6-octen-1-ol), para-cymen-7-ol, 3,7-dimethyl-1-octanol, 2-ethoxy-4-hydroxy benzaldehyde, eugenol (4-allyl-2-methoxy phenol), farnesol (3,7,11-trimethyl-2,6,10-dodecatrien-1-ol), 1,3,3-trimethyl-2-norbornanol, geraniol (3,7-dimethyl-2,6-octadien-1-ol), n-hexyl salicylate, 2-phenyl propyl alcohol, 2-(cyclododecyl)-propan-1-ol, 3-methyl-1-butanol, 2,4,6-trimethyl-3-cyclohexene-1-methanol, 2-methoxy-4-(1-propenyl) phenol, 2-(5,6,6-trimethyl-2-norbornyl) cyclohexanol isomers, 7-methyl-1-octanol, ethyl-3-hydroxy-3-phenyl propionate, 3-(hydroxy methyl)-2-nonanone, 3-methyl-3-penten-1-ol, 3-methyl-1-pentanol, 6,8-dimethyl-2-nonanol, Octanol, 4-hydroxy toluene, 4-(p-hydroxy phenyl) butanone, 4-tertiary butyl phenol, 4-tert-butyl cyclohexanol, phenyl ethyl alcohol (phenethanol), 3-phenyl propanol, 3,3-dimethyl-5-(2,2,3-trimethyl-3-cyclopenten-1-yl)-4-penten-2-ol, 3,7-dimethyl-7-octenol and 3,7-dimethyl-6-octenol, 9-decen-1-ol, 4-isopropyl cyclohexanol, 2-methyl-5-phenyl-pentan-1-ol, 5-(2,2,3-trimethyl-3-cyclopentenyl)-3-methylpentan-2-ol, 2-methyl-5-(2,3-dimethyl tricyclo[2.2.1.0(2,6)]hept-3-yl)-2-penten-1-ol, 2-isopropyl-5-methyl phenol, 2,2,6-trimethyl-alpha-propyl cyclohexane propanol racemic, decahydro-2-naphthol, 1,7,7-trimethylbicyclo[1.2.2]heptan-2-ol, 3,3,5-trimethyl cyclohexanol, undecavertol (4-methyl-3-decen-5-ol), 10-undecen-1-ol, vanillin (4-hydroxy-5-methoxy benzaldehyde), 2-tert-butyl cyclohexanol, Methyl 2,4-dihydroxy-3,6-dimethyl benzoate, isopulegol (1-methyl-4-isopropenyl cyclohexan-3-ol), 4-(1-methylethyl) cyclohexanemethanol, phenoxanol (3-methyl-5-phenyl-1-pentanol), 5,6-dimethyl-1-methylethenyl-bicyclo[2.2.1] hept-5-ene-2-methanol, 2,4-dimethyl-1-heptanol, 2-isopropenyl-5-methyl-4-hexen-1-ol, 2-methyl-3-phenyl-1-propanol, 2-benzyl-M-dioxan-5-ol, 1-undecanol, 2-(4-methylphenoxy)-ethanol, 2,4-dimethyl-2,6-heptadienol, 2,4-decadien-1-ol, 2-decen-1-ol, 1-hydroxymethyl-4-isopropenyl-1-cyclohexene, 2,4-dodecadien-1-ol, 2-dodecen-1-ol, 2-methyl-3-phenyl-2-propen-1-ol, 6,6-dimethyl-2-oxymethylbicyclo[3.1.1]hept-2-ene, 2,4-nonadien-1-ol, 2-nonen-1-ol, 2,4-octadien-1-ol and 4-methyl-2,4-heptadien-1-ol, 2-octen-1-ol, 3,7,11,15-tetramethyl hexadec-2-en-1-ol, 3-methyl-2-buten-1-ol, 2-methyl-4-(2,2,3-trimethyl-3-cyclopenten-1-yl)-2-buten-1-ol, 2-undecen-1-ol, para-methoxy benzyl alcohol, 4-methyl benzyl alcohol, 3,4-methylenedioxy benzyl alcohol, 3-nonanol, beta-methyl cyclohexane ethanol, 4-phenyl-2-butanol, 1-phenyl-2-pentanol, 1-methyl-4-isopropenyl cyclohex-6-en-2-ol, 4-phenyl-3-buten-2-ol, 6,6-dimethyl-3-hydroxy-2-methylenebicyclo[3.1.1]heptane, 1-phenyl-1-hydroxyethane, 1-phenyl-1-propanol, 2-tert-butyl-4-methyl-cyclohexanol, 4-ethyl-2-methoxy phenol, Ethyl 2-hydroxy benzoate, 4-allyl-2,6-dimethoxyphenol, 3-hydroxy-5-methoxy toluene, para-tert-butyl-meta cresol, 1-ethoxy-2-hydroxy-4-propenyl benzene, 2-ethoxy-4-methyl phenol, 2-methyl-4-vinyl phenol, 4-(4-hydroxy-3-methoxyphenyl)-2-butanone, 3,7-dimethyl-7-methoxy octan-2-ol, 3-(4-methylcyclohex-3-ene) butanol, majantol (2,2-dimethyl-3-(3-methylphenyl)-1-propanol), 2-ethyl-2-prenyl-3-hexenol, 4,7-dimethyl-4-vinyl-6-octen-3-ol, 3,6-d imethyl-3-vinyl-5-hepten-2-ol, 6,6-dimethylbicyclo[3.1.1]hept-2-ene-2-ethanol, trans-2-hexenol, 4-isopropyl-1-methyl cyclohexan-3-ol; 2-isopropyl-5-methyl cyclohexanol, 1-(4-isopropylcyclohexyl)-ethanol, 2,6,9-trimethyl-2,5,9-dodecatrien-1-ol isomers and 2,6,9-trimethyl-2,5-dodecadien-1-ol isomers, cyclohexanethanol, 2,4-dimethyl cyclohexane methanol, floralol (2,4-dimethyl-3- cyclohexene-1-methanol), o,m,p-methyl phenyl ethanol, 2-methyl-4-phenyl-1-pentanol, cis-3-pentenol, Alpha-n-amyl cinnamyl alcohol, 3,3-dimethyl-delta-2, beta-norbornane ethanol, ethyl-3-hydroxy butyrate, 4-methyl-1-phenyl-2-pentanol, 3,4,5,6,6-pentamethyl-2-heptanol, 1-octen-3-ol, 6-methyl-3-isopropenyl cylohexan-1-ol, 4,7-methano-1H-inden-5-ol, 3a,4,5,6,7,7a-hexahydro-2(or 3), 4, dimethyl, 2-methyl butyl salicylate, n-amyl salicylate, beta phenyl ethyl salicylate, 2-isopropyl-5-methyl-2-hexenol, (1-methyl-bicyclo[2.2.1]hepten-2-yl)-2-methyl-pent-1-en-3-ol, Isobornyl cyclohexanol isomers, linalool, tetrahydrolinalool, 1,2-dihydromyrcenol, hydroxycitronellal, terpineol, 2-phenoxyethanol, menthol, rosalva (9-decen-1-ol) and mixtures thereof.

Preferably, for the above mentioned compounds, the preferred alcohol are selected from 2-phenoxyethanol, phenyl ethyl alcohol, geraniol, citronellol, phenoxanol, floralol, farnesol, menthol, isopulegol, eugenol, vanillin, cis-3-hexenol, undecavertol, majantol, rosalva, linalool, tetrahydrolinalool, 1,2-dihydromyrcenol, hydroxycitronellal, terpineol and mixtures thereof. Most preferred R groups for the purpose of the invention are the organic chains of active alcohol in which the alcohol is selected from geraniol, citronellol, linalool, phenylethyl alcohol, undecavertol, majantol, rosalva, 1,2-dihydromyrcenol and mixtures thereof.

Perfume aldehyde components include components having odoriferous properties.

Preferably, for the above mentioned compounds, the R' group is the organic chain of a perfume aldehyde, said aldehyde being selected from 2,6,10-trimethyl-9-undecenal, 3-dodecen-1-al, alpha-n-amyl cinnamic aldehyde, 4-methoxybenzaldehyde, benzaldehyde, 3-(4-tert butylphenyl)-propanal, 2-methyl-3-(para-methoxyphenyl propanal, 2-methyl-4-(2,6,6-trimethyl-2(1)-cyclohexen-1-yl) butanal, 3-phenyl-2-propenal, cis-/trans-3,7-dimethyl-2,6-octadien-1-al, 3,7-dimethyl-6-octen-1-al, [(3,7-dimethyl-6-octenyl)oxy] acetaldehyde, 4-isopropylbenzyaldehyde, 1,2,3,4,5,6,7,8-octahydro-8,8-dimethyl-2-naphthaldehyde, 2,4-dimethyl-3-cyclohexen-1-carboxaldehyde, 2-methyl-3-(isopropylphenyl)propanal, 1-decanal; decyl aldehyde, 2,6-dimethyl-5-heptenal, 4-(tricyclo[5.2.1.0(2,6)]-decylidene-8)-butanal, octahydro-4,7-methano-1H-indenecarboxaldehyde, 3-ethoxy-4-hydroxy benzaldehyde, para-ethyl-alpha, alpha-dimethyl hydrocinnamaldehyde, alpha-methyl-3,4-(methylenedioxy)-hydrocinnamaldehyde, 3,4-methylenedioxybenzaldehyde, alpha-n-hexyl cinnamic aldehyde, m-cymene-7-carboxaldehyde, alpha-methyl phenyl acetaldehyde, 7-hydroxy-3,7-dimethyl octanal, Undecenal, 2,4,6-trimethyl-3-cyclohexene-1-carboxaldehyde, 4-(3)(4-methyl-3-pentenyl)-3-cyclohexen-carboxaldehyde, 1-dodecanal, 2,4-dimethyl cyclohexene-3-carboxaldehyde, 4-(4-hydroxy-4-methyl pentyl)-3-cylohexene-1-carboxaldehyde, 7-methoxy-3,7-dimethyloctan-1-al, 2-methyl undecanal, 2-methyl decanal, 1-nonanal, 1-octanal, 2,6,10-trimethyl-5,9-undecadienal, 2-methyl-3-(4-tertbutyl)propanal, Phenylacetaldehyde, dihydrocinnamic Aldehyde, 1-methyl-4-(4-methyl-3-pentenyl)-3-cyclohexene-1-carboxaldehyde, 5 or 6 methoxyOhexahydro-4,7-methanoindan-1 or 2-carboxaldehyde, 3,7-dimethyloctan-1-al, 2,4-dimethyl-3-cyclohexene-1-carboxaldehyde, 1-undecanal, 10-undecen-1-al, 4-hydroxy-3-methoxy benzaldehyde, 1-methyl-3-(4-methylpentyl)-3-cyclhexenecarboxaldehyde, 2,4-dimethyl-3-cyclohexene-1-carboxaldehyde, 7-hydroxy-3,7-dimethyl-octanal, trans-4-decenal, 2,6-nonadienal, para-tolylacetaldehyde; 4-methylphenylacetaldehyde, 2-methyl-4-(2,6,6-trimethyl-1-cyclohexen-1-yl)-2-butenal, ortho-methoxycinnamic aldehyde, 3,5,6-trimethyl-3-cyclohexene carboxaldehyde and 2,4,6-trimethyl-3-cyclohexene carboxaldehyde, 3,7-dimethyl-2-methylene-6-octenal, Phenoxyacetaldehyde, 5,9-dimethyl-4,8-decadienal, Peony Aldehyde (6,10-dimethyl-3-oxa-5,9-undecadien-1-al), hexahydro-4,7-methanoindan-1-carboxxaldehyde, 2-methyl octanal, alpha-methyl-4-(1-methyl ethyl) benzene acetaldehyde, 6,6-dimethyl-2-norpinene-2-propionaldehyde, para methyl phenoxy acetaldehyde, 2-methyl-3-phenyl-2-propen-1-al, 3,5,5-trimethyl hexanal, Hexahydro-8,8-dimethyl-2-naphthaldehyde, 3-propyl-bicyclo[2.2.1]-hept-5-ene-2-carbaldehyde, 9-decenal, 3-methyl-5-phenyl-1-pentanal, methylnonyl acetaldehyde, benzaldehyde, and mixtures thereof.

Most preferred aldehydes are selected from 1-octanal, 1-decanal, 1-dodecanal, methyinonyl acetaldehyde, trans-4-decenal, benzaldehyde and mixture thereof.

For the purpose of the invention, mixtures of the above compounds comprising one or more active alcohols or aldehydes may also be used.

Mechanism of Release

By the present invention, a delayed release of an active ingredient, i.e. alcohol or mixture of aldehyde/alcohol is obtained. Not to be bound by theory, the release is believed to occur by the following mechanisms:

For the cases where m and q are 0 and n=1, the active alcohol(s) islare released upon hydrolysis of either the acetal/hemiacetal bond(s) OR2 and/or OR3 or by hydrolysis of the ester bond.

For the case of dialkoxyacetate of active alcohol such as dimethoxyacetates, the active is released upon hydrolysis of the ester bond.

For hemiacetals of glyoxylic esters, such as methyl 2-hydroxy-2-activeloxyacetates or active2 2-hydroxy-2-activeloxyacetates, it is believed that the hemiacetal bond hydrolyses first, releasing the active alcoholl and leading to the formation of active2 glyoxylate (or its hydrate active2 2,2-dihydroxyacetate). The ester bond of active2 glyoxylate (or its hydrate active2 2,2-dihydroxyacetate) subsequently hydrolyses releasing the active alcohol2.

For the cases m=0 and n≧2 (polymers of keto carboxylates), the active alcohols are released upon hydrolysis of the ester bonds. This release can take place by hydrolysis of the ester bond of the polymer itself or by hydrolysis of the ester bond of the monomeric keto carboxylates generated by hydrolysis of the acetal bond on the polymer backbone, upon usage.

For the cases of copolymers or oligomers of active aldehydes and keto carboxylates (m≧1 and n≧1), the active aldehydes are released upon hydrolysis of the acetals bond forming the backbone of the polymer, leading to the release of the active aldehyde and keto carboxylates. The active alcohols are released upon hydrolysis of the ester bonds of either the polymer or of the keto carboxylates released upon hydrolysis of the acetals bond forming the backbone of the polymer.

Process

Preparation of the component is made as follows in the Synthesis Examples. In general, process for preparing a glyoxylic compound comprising one or more active alcohols comprises the steps of reacting the glyoxylic compound with an active alcohol by transacetalization and/or transesterification.

For the poly(keto carboxylates) compounds comprising one or more active alcohol or mixed alcohol/aldehyde ingredients, these compounds are prepared by polymerisation of the keto carboxylates $R'_1OC(CR_4R_4)_qCOOR$ or copolymerisation with an active aldehyde, and followed by transesterification of the resulting compound with the active alcohol, in presence of a base catalyst.

Preferred features of these general processes for manufacturing the present compounds invention are described hereinafter.

Glycolic Esters of Active Alcohols

A preferred process for preparing glycolic esters of active alcohols is to transesterify a methyl or ethyl ester of glycolic acid such as methyl or ethyl glycolate (or the required ether such as methyl 2-methoxyacetate or ethyl 2-ethoxyacetate) with the required active alcohol (used at a concentration between 0.1 equivalent and 10 equivalents, preferably between 0.5 equivalent and 4 equivalents, more preferably between 0.9 equivalent and 1.1 equivalents), in presence of a catalyst (generally sodium methoxide) used at a concentration between 0.01 equivalent and 1 equivalent, preferably between 0.02 equivalent and 0.25 equivalent). To drive the reaction to completion, the methanol or ethanol produced by the transesterification is distilled off. This can be done under atmospheric pressure or reduced pressure, with or without any solvent required. If a solvent is used, toluene is preferred.

Acetals of glyoxylic esters of active alcohols can also be prepared by the above process.

Hemiacetals of Glyoxylic Esters of Active Alcohols

A preferred process for preparing hemiacetals of glyoxylic esters of active alcohols, such as methyl 2-hydroxy-2-adtiveoxyacetates or ethyl 2-hydroxy-2-activeoxyacetates is to transacetalate an alkyl 2-hydroxy-2-alkoxyacetate (such as methyl 2-hydroxy-2-methoxyacetate or ethyl 2-hydroxy-2-ethoxyacetate) with the required active alcohol (used at a concentration between 0.1 equivalent and 10 equivalents, preferably between 0.5 equivalent and 4 equivalents, more preferably between 0.9 equivalent and 1.1 equivalents), in presence of a catalyst (generally sodium methoxide) used at a concentration between 0.01 equivalent and 1 equivalent, preferably between 0.02 equivalent and 0.1 equivalent). To drive the reaction to completion, the methanol or ethanol produced by the transacetalization is distilled off. This can be done under atmospheric pressure or reduced pressure, with or without any solvent required. If a solvent is used, toluene is preferred. It was also found that, if the alcohol produced by the transacetalization is distilled off, no catalyst was really needed to drive the reaction since only traces of an acidic catalyst (such as hydrochloric or sulfuric acids) or an alkaline catalyst (such as sodium hydroxide or sodium methoxide) are enough to drive the reaction. However, to speed up the reaction, an acidic catalyst (such as hydrochloric or sulfuric acids) or an alkaline catalyst (such as sodium hydroxide or sodium methoxide) can be added to the reaction mixture.

Another preferred process for preparing hemiacetals of glyoxylic esters of active alcohols, such as methyl 2-hydroxy-2-activeoxyacetates or ethyl 2-hydroxy-2-activeoxyacetates is to react some freshly distilled alkyl glyoxylate (such as methyl glyoxylate or ethyl glyoxylate) with the required active alcohol (used at a concentration between 0.1 equivalent and 10 equivalents, preferably between 0.5 equivalent and 4 equivalents, more preferably between 0.9 equivalent and 1.1 equivalents). It was found that with freshly distilled methyl glyoxylate (obtained by distillation from methyl 2-hydroxy-2-methoxyacetate in presence of phosphorus pentoxide) and a primary or a secondary alcohol, no catalyst was required.

A further preferred process for preparing hemiacetals of glyoxylic esters of active alcohols, such as 2-hydroxy-2-activeoxyacetate active esters is to transesterify and transacetalate an alkyl 2-hydroxy-2-alkoxyacetate (such as methyl 2-hydroxy-2-methoxyacetate or ethyl 2-hydroxy-2-ethoxyacetate) with the required active alcohol (or mixture of alcohols) (used at a concentration between 0.1 equivalent and 10 equivalents, preferably between 0.5 equivalent and 4 equivalents, more preferably between 1.8 equivalents and 2.2 equivalents), in presence of a catalyst (generally sodium methoxide) used at a concentration between 0.01 equivalent and 2 equivalents, preferably between 0.02 equivalent and 0.4 equivalent). To drive the reaction to completion, the methanol or ethanol produced by the transesterification and the transacetalization is distilled off. This can be done under atmospheric pressure or reduced pressure, with or without any solvent required. If a solvent is used, toluene is preferred.

Still another preferred process for preparing hemiacetals of glyoxylic esters of active alcohols, such as 2-hydroxy-2-activeoxyacetate active esters is to transesterify some alkyl 2-hydroxy-2-activeoxyacetate (such as methyl 2-hydroxy-2-activeoxyacetate or ethyl 2-hydroxy-2-activeoxyacetate) with the required active alcohol (used at a concentration between 0.1 equivalent and 10 equivalents, preferably between 0.5 equivalent and 4 equivalents, more preferably between 0.9 equivalent and 1.1 equivalents), in presence of a catalyst (generally sodium methoxide) used at a concentration between 0.01 equivalent and 1 equivalent, preferably between 0.02 equivalent and 0.25 equivalent). To drive the reaction to completion, the methanol or ethanol produced by the transesterification is distilled off. This can be done under atmospheric pressure or reduced pressure, with or without any solvent required. If a solvent is used, toluene is preferred. Preparation of alkyl 2-hydroxy-2-activeloxyacetate from freshly distilled alkyl glyoxylate and the required active alcoholl followed by subsequent transesterification of the alkyl 2-hydroxy-2-activel oxyacetate with the required active alcohol2, in presence of a catalytic amount of sodium methoxide is the preferred route to prepare specifically glyoxylic esters of active alcohols, such as 2-hydroxy-2-activeloxyacetate active2 esters where both active alcohols 1 and 2 are different.

Polymers or copolymers of keto carboxylates $R'_1OC(CR_4R_4)_qCOOR$ of active alcohol or mixed active alcohol/aldehydes can be obtained in a two steps process which is exemplified below for polymers or copolymers of glyoxylic esters of active alcohol or mixed active alcohol/aldehydes.

A preferred process for preparing polymers or copolymers of glyoxylic esters is:

(A)- to bring together under polymerisation conditions some freshly distilled ester of glyoxylic acid (such as methyl glyoxylate or ethyl glyoxylate), with or without more materials capable of copolymerising with the ester of glyoxylic acid such as epoxy compounds or preferably an active aldehyde, along with a polymerisation initiator.

(B)- End-capping the resulting polymer or copolymer with a suitable chemical group so that the in-product stability of the polymer can be optimised to prevent excessive depolymerisation in-product.

(C)- Transesterify the polymer or copolymer obtained with the required active alcohol (such as a perfume alcohol), in presence of a catalyst such as sodium methoxide. To favour transesterification, it is advantageous to distil off the alcohol produced by the transesterification (such as methanol or ethanol). It will be known to those skilled in the art that complete transesterification is not always achievable so the final polymer can contain both some methyl ester bonds, along with the wanted active alcohol ester bonds. Preferably, the amount of residual methyl ester bonds should be as low as possible.

Suitable initiator for the polymerisation are know to those skilled in the art and described in the art such as in U.S. Pat. No. 4,204,052 column 4, lines 3–15. Preferred initiators are phosphorus pentoxide, amines, strong Lewis acid, hydroxide or cyanide ions or sodiomalonates or sodiomethylmalonate esters. Once the polymer or copolymer of glyoxylic ester (or more generally the aldehyde ester) has been prepared, any number of chemically reactive groups can be added to the polymer or copolymer termini, preferably using an ionic catalyst such as boron trifluoride etherate, trifluoroacetic acid and the like as described in U.S. Pat. No. 4,204,052 column 5, line 25 to column 6, line 28. Particularly suitable end groups include alkyl groups, alkyl groups containing oxygen such as methoxy or ethers such as $OCH(CH_3)OC_2H5$, and alkyl groups containing carboxylic acids. The chemical nature of the chemically reactive group is not important in the proper function of the polymer or copolymer in its intended use to release active alcohols and/or aldehydes. It is only necessary that the chemically reactive group stabilises the polymer or copolymer so that to limit the depolymerisation before use. The end-capping group can be chosen so that depolymerisation upon usage is triggered by either hydrolysis, photochemical cleavage, enzymatic cleavage or oxidative cleavage of the bond linking the end-capping group to the rest of the polymer.

In the same way, in the copolymer, the comonomers can be chosen so that depolymerisation upon usage is triggered by either hydrolysis, photochemical cleavage, enzymatic cleavage or oxidative cleavage of the bond linking the comonomers to the rest of the polymer.

The polymerisation step (A) can be done with or without solvent. Suitable solvents include alkyl nitrites, preferably acetonitrile, dimethyl sulfoxide, acetone, halogenated alkanes, preferably dichloromethane or chloroform, tetrahydrofuran, ethyl acetate and the like. When a solvent is used, the choice of the solvent is driven, so that it does not interfere with the polymerisation and can be separated from the resulting polymer with relative ease. These solvents can also be used for the end-capping step (B). Dichloromethane and acetonitrile are the preferred solvents for both steps (A) and (B) of the process.

For the transesterification step (C), suitable solvents are those which dissolve the polymer, does not interfere with it and can help the distillation of the alcohol produced by the transesterification. Toluene is the preferred solvent for steps (C) of the process.

Laundry and Cleaning Compositions

The present invention compositions include both laundry and cleaning compositions which are typically used for laundering fabrics and cleaning hard surfaces such as dishware, floors, bathrooms, toilet, kitchen and other surfaces in need of a delayed release of an active alcohol or mixed alcohol/aldehyde. This also includes compositions for use in personal cleansing such as shower gels, deodorants, bars, shampoos.

Preferred are those laundry compositions which result in contacting the compound of the invention with fabric. Preferably, for use in such laundry and cleaning products, the active alcohol is a perfume such as geraniol.

These are to be understood to include not only detergent compositions which provide fabric cleaning benefits, but also compositions such as rinse added fabric softener compositions and dryer added compositions (e.g. sheets) which provide softening and/or antistatic benefits as well as hard surface cleaning.

The compound(s) of the invention typically comprise from 0.01% to 10%, preferably from 0.05% to 5%, and more preferably from 0.1% to 2%, by weight of the composition. Mixtures of the compounds may also be used herein.

Optional ingredients useful for formulating such laundry and cleaning compositions according to the present invention include one or more of the following.

Fabric Softening Agents

A fabric softener component may also suitably be used in the laundry and cleaning compositions of the invention so as to provide softness and antistastic properties to the treated fabrics. When used, the fabric softener component will typically be present at a level sufficient to provide softening and antistatic properties.

Said fabric softening component may be selected from cationic, nonionic, amphoteric or anionic fabric softening component.

Typical of the cationic softening components are the quaternary ammonium compounds or amine precursors thereof as defined hereinafter.

A)-Quaternary Ammonium Fabric Softening Active Compound (1) Preferred quaternary ammonium fabric softening active compound have the formula

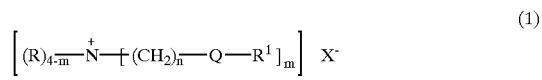
(1)

or the formula:

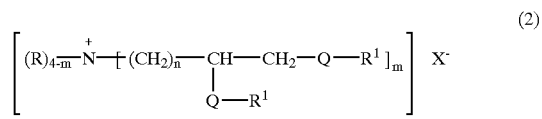
(2)

wherein Q is a carbonyl unit having the formula:

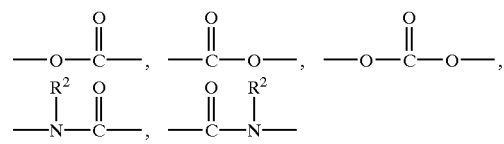

each R unit is independently hydrogen, $C_1$–$C_6$ alkyl, $C_1$–$C_6$ hydroxyalkyl, and mixtures thereof, preferably methyl or hydroxy alkyl; each $R^1$ unit is independently linear or branched $C_{11}$–$C_{22}$ alkyl, linear or branched $C_{11}$–$C_{22}$ alkenyl, and mixtures thereof, $R^2$ is hydrogen, $C_1$–$C_4$ alkyl, $C_1$–$C_4$ hydroxyalkyl, and mixtures thereof; X is an anion which is compatible with fabric softener actives and adjunct ingredients; the index m is from 1 to 4, preferably 2; the index n is from 1 to 4, preferably 2.

An example of a preferred fabric softener active is a mixture of quaternized amines having the formula:

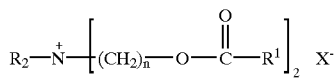

wherein R is preferably methyl; $R^1$ is a linear or branched alkyl or alkenyl chain comprising at least 11 atoms, preferably at least 15 atoms. In the above fabric softener example, the unit —$O_2CR^1$ represents a fatty acyl unit which is typically derived from a triglyceride source. The triglyceride source is preferably derived from tallow, partially hydrogenated tallow, lard, partially hydrogenated lard, vegetable oils and/or partially hydrogenated vegetable oils, such as, canola oil, safflower oil, peanut oil, sunflower oil, corn oil, soybean oil, tall oil, rice bran oil, etc. and mixtures of these oils.

The preferred fabric softening actives of the present invention are the Diester and/or Diamide Quaternary Ammonium (DEQA) compounds, the diesters and diamides having the formula:

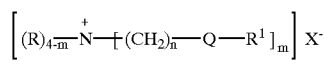

wherein R, $R^1$, X, and n are the same as defined herein above for formulas (1) and (2), and Q has the formula:

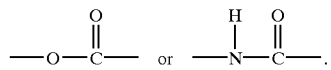

These preferred fabric softening actives are formed from the reaction of an amine with a fatty acyl unit to form an amine intermediate having the formula:

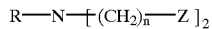

wherein R is preferably methyl, Z is —OH, —$NH_2$, or mixtures thereof; followed by quaternization to the final softener active.

Non-limiting examples of preferred amines which are used to form the DEQA fabric softening actives according to the present invention include methyl bis(2-hydroxyethyl) amine having the formula:

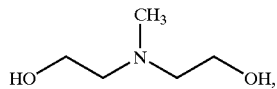

methyl bis(2-hydroxypropyl)amine having the formula:

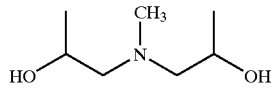

methyl (3-aminopropyl) (2-hydroxyethyl)amine having the formula:

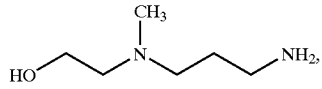

methyl bis(2-aminoethyl)amine having the formula:

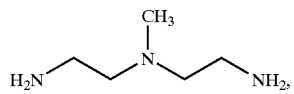

triethanol amine having the formula:

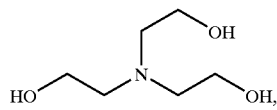

di(2-aminoethyl) ethanolamine having the formula:

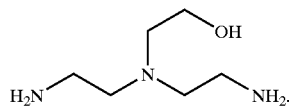

The counterion, X(−) above, can be any softener-compatible anion, preferably the anion of a strong acid, for example, chloride, bromide, methylsulfate, ethylsulfate, sulfate, nitrate and the like, more preferably chloride or methyl sulfate. The anion can also, but less preferably, carry a double charge in which case X(−) represents half a group.

Tallow and canola oil are convenient and inexpensive sources of fatty acyl units which are suitable for use in the present invention as $R^1$ units. The following are non-limiting examples of quaternary ammonium compounds suitable for use in the compositions of the present invention. The term "tallowyl" as used herein below indicates the $R^1$ unit is derived from a tallow triglyceride source and is a mixture of fatty acyl units. Likewise, the use of the term canolyl refers to a mixture of fatty acyl units derived from canola oil.

TABLE II

| Fabric Softener Actives |
| --- |
| N,N-di(tallowyl-oxy-ethyl)-N,N-dimethyl ammonium chloride; |
| N,N-di(canolyl-oxy-ethyl)-N,N-dimethyl ammonium chloride; |
| N,N-di(tallowyl-oxy-ethyl)-N-methyl, N-(2-hydroxyethyl) ammonium chloride; |
| N,N-di(canolyl-oxy-ethyl)-N-methyl, N-(2-hydroxyethyl) ammonium chloride; |
| N,N-di(2-tallowyloxy-2-oxo-ethyl)-N,N-dimethyl ammonium chloride; |
| N,N-di(2-canolyloxy-2-oxo-ethyl)-N,N-dimethyl ammonium chloride |
| N,N-di(2-tallowyloxyethylcarbonyloxyethyl)-N,N-dimethyl ammonium chloride; |
| N,N-di(2-canolyloxyethylcarbonyloxyethyl)-N,N-dimethyl ammonium chloride; |
| N-(2-tallowoyloxy-2-ethyl)-N-(2-tallowyloxy-2-oxo-ethyl)-N,N-dimethyl ammonium chloride; |
| N-(2-canolyloxy-2-ethyl)-N-(2-canolyloxy-2-oxo-ethyl)-N,N-dimethyl ammonium chloride; |
| N,N,N-tri(tallowyl-oxy-ethyl)-N-methyl ammonium chloride; |
| N,N,N-tricanolyl-oxy-ethyl)-N-methyl ammonium chloride; |
| N-(2-tallowyloxy-2-oxoethyl)-N-(tallowyl)-N,N-dimethyl ammonium chloride; |
| N-(2-canolyloxy-2-oxoethyl)-N-(canolyl)-N,N-dimethyl ammonium chloride; |

TABLE II-continued

Fabric Softener Actives 1,2-ditallowyloxy-3-N,N,N-trimethylammoniopropane chloride; and 1,2-dicanolyloxy-3-N,N,N-trimethyl-ammoniopropane chloride;
and mixtures of the above actives.

Other examples of quaternay ammoniun softening compounds are methylbis(tallowamidoethyl)(2-hydroxyethyl) ammonium methylsulfate and methylbis(hydrogenated tallowamidoethyl)(2-hydroxyethyl)ammonium methylsulfate; these materials are available from Witco Chemical Company under the trade names Varisoft® 222 and Varisoft® 110, respectively.

Particularly preferred is N,N-di(tallowoyl-oxy-ethyl)-N,N-dimethyl ammonium chloride, where the tallow chains are at least partially unsaturated.

The level of unsaturation contained within the tallow, canola, or other fatty acyl unit chain can be measured by the Iodine Value (IV) of the corresponding fatty acid, which in the present case should preferably be in the range of from 5 to 100 with two categories of compounds being distinguished, having a IV below or above 25.

Indeed, for compounds having the formula:

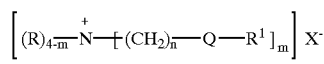

derived from tallow fatty acids, when the Iodine Value is from 5 to 25, preferably 15 to 20, it has been found that a cis/trans isomer weight ratio greater than 30/70, preferably greater than 50/50 and more preferably greater than 70/30 provides optimal concentrability.

For compounds of this type made from tallow fatty acids having a Iodine Value of above 25, the ratio of cis to trans isomers has been found to be less critical unless very high concentrations are needed.

Other suitable examples of fabric softener actives are derived from fatty acyl groups wherein the terms "tallowyl" and canolyl" in the above examples are replaced by the terms "cocoyl, palmyl, lauryl, oleyl, ricinoleyl, stearyl, palmityl," which correspond to the triglyceride source from which the fatty acyl units are derived. These alternative fatty acyl sources can comprise either fully saturated, or preferably at least partly unsaturated chains.

As described herein before, R units are preferably methyl, however, suitable fabric softener actives are described by replacing the term "methyl" in the above examples in Table II with the units "ethyl, ethoxy, propyl, propoxy, isopropyl, butyl, isobutyl and t-butyl.

The counter ion, X, in the examples of Table II can be suitably replaced by bromide, methylsulfate, formate, sulfate, nitrate, and mixtures thereof. In fact, the anion, X, is merely present as a counterion of the positively charged quaternary ammonium compounds. The scope of this invention is not considered limited to any particular anion.

For the preceding ester fabric softening agents, the pH of the compositions herein is an important parameter of the present invention. Indeed, it influences the stability of the quaternary ammonium or amine precursors compounds, especially in prolonged storage conditions.

The pH, as defined in the present context, is measured in the neat compositions at 20° C. While these compositions are operable at pH of less than 6.0, for optimum hydrolytic stability of these compositions, the neat pH, measured in the above-mentioned conditions, must preferably be in the range of from 2.0 to 5, preferably in the range of 2.5 to 4.5, preferably 2.5 to 3.5. The pH of these compositions herein can be regulated by the addition of a Bronsted acid.

Examples of suitable acids include the inorganic mineral acids, carboxylic acids, in particular the low molecular weight ($C_1$–$C_5$) carboxylic acids, and alkylsulfonic acids. Suitable inorganic acids include HCl, $H_2SO_4$, $HNO_3$ and $H_3PO_4$. Suitable organic acids include formic, acetic, citric, methylsulfonic and ethylsulfonic acid. Preferred acids are citric, hydrochloric, phosphoric, formic, methylsulfonic acid, and benzoic acids.

As used herein, when the diester is specified, it will include the monoester that is normally present in manufacture. For softening, under no/low detergent carry-over laundry conditions the percentage of monoester should be as low as possible, preferably no more than 2.5%. However, under high detergent carry-over conditions, some monoester is preferred. The overall ratios of diester to monoester are from 100:1 to 2:1, preferably from 50:1 to 5:1, more preferably from 13:1 to 8:1. Under high detergent carry-over conditions, the di/monoester ratio is preferably 11:1. The level of monoester present can be controlled in the manufacturing of the softener compound.

Mixtures of actives of formula (1) and (2) may also be prepared.

2)-Still other suitable quaternary ammonium fabric softening compounds for use herein are cationic nitrogenous salts having two or more long chain acyclic aliphatic $C_8$–$C_{22}$ hydrocarbon groups or one said group and an arylalkyl group which can be used either alone or as part of a mixture are selected from the group consisting of:

(i) acyclic quaternary ammonium salts having the formula:

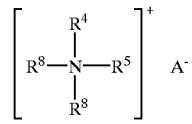

wherein $R^4$ is an acyclic aliphatic $C_8$–$C_{22}$ hydrocarbon group, $R^5$ is a $C_1$–$C_4$ saturated alkyl or hydroxyalkyl group, $R^8$ is selected from the group consisting of $R^4$ and $R^5$ groups, and A– is an anion defined as above;

(ii) diamino alkoxylated quaternary ammonium salts having the formula:

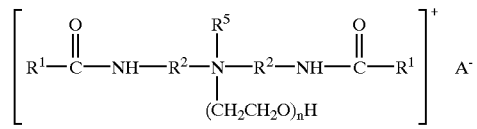

wherein n is equal to 1 to 5, and $R^1$, $R^2$, $R^5$ and $A^-$ are as defined above;

(iii) mixtures thereof.

Examples of the above class cationic nitrogenous salts are the well-known dialkyldi methylammonium salts such as ditallowdimethylammonium chloride, ditallowdimethylammonium methylsulfate, di(hydrogenatedtallow) dimethylammonium chloride, distearyldimethylammonium chloride, dibehenyldimethylammonium chloride. Di(hydrogenatedtallow)di methylammonium chloride and ditallowdimethylammonium chloride are preferred. Examples of commercially available dialkyldimethyl ammonium salts usable in the present invention are di(hydrogenatedtallow)dimethylammonium chloride (trade name Adogen® 442), ditallowdimethylammonium chloride (trade name Adogen® 470, Praepagen® 3445), distearyl dimethylammonium chloride (trade name Arosurf® TA-100), all available from Witco Chemical Company. Dibehenyidimethylammonium chloride is sold under the trade name Kemamine Q-2802C by Humko Chemical Division of Witco Chemical Corporation.

Dimethylstearylbenzyl ammonium chloride is sold under the trade names Varisoft® SDC by Witco Chemical Company and Ammonyx® 490 by Onyx Chemical Company.

B)-Amine Fabric Softening Active Compound

Suitable amine fabric softening compounds for use herein, which may be in amine form or cationic form are selected from:

(i)- Reaction products of higher fatty acids with a polyamine selected from the group consisting of hydroxyalkylalkylenediamines and dialkylenetriamines and mixtures thereof. These reaction products are mixtures of several compounds in view of the multi-functional structure of the polyamines.

The preferred Component (i) is a nitrogenous compound selected from the group consisting of the reaction product mixtures or some selected components of the mixtures.

One preferred component (i) is a compound selected from the group consisting of substituted imidazoline compounds having the formula:

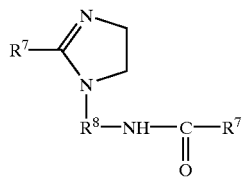

wherein $R^7$ is an acyclic aliphatic $C_{15}$–$C_{21}$ hydrocarbon group and $R^8$ is a divalent $C_1$–$C_3$ alkylene group.

Component (i) materials are commercially available as: Mazamide® 6, sold by Mazer Chemicals, or Ceranine® HC, sold by Sandoz Colors & Chemicals; stearic hydroxyethyl imidazoline sold under the trade names of Alkazine® ST by Alkaril Chemicals, Inc., or Schercozoline® S by Scher Chemicals, Inc.; N,N"-ditallowalkoyldiethylenetriamine; 1-tallowamidoethyl-2-tallowimidazoline (wherein in the preceding structure $R^1$ is an aliphatic $C_{15}$–$C_{17}$ hydrocarbon group and $R^8$ is a divalent ethylene group).

Certain of the Components (i) can also be first dispersed in a Bronsted acid dispersing aid having a pKa value of not greater than 4; provided that the pH of the final composition is not greater than 6. Some preferred dispersing aids are hydrochloric acid, phosphoric acid, or methylsulfonic acid.

Both N,N"-ditallowalkoyidiethylenetriamine and 1-tallow(amidoethyl)-2-tallowimidazoline are reaction products of tallow fatty acids and diethylenetriamine, and are precursors of the cationic fabric softening agent methyl-1-tallowamidoethyl-2-tallowimidazolinium methylsulfate (see "Cationic Surface Active Agents as Fabric Softeners," R. R. Egan, Journal of the American Oil Chemicals' Society, January 1978, pages 118–121). N,N"-ditallow alkoyldiethylenetriamine and 1-tallowamidoethyl-2-tallowimidazoline can be obtained from Witco Chemical Company as experimental chemicals. Methyl-1-tallowamidoethyl-2-tallowimidazolinium methylsulfate is sold by Witco Chemical Company under the tradename Varisoft® 475.

(ii)-softener having the formula:

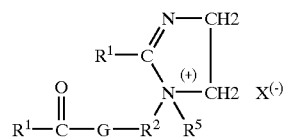

wherein each $R^2$ is a $C_{1-6}$ alkylene group, preferably an ethylene group; and G is an oxygen atom or an —NR— group; and each R, $R^1$, $R^2$ and $R^5$ have the definitions given above and $A^-$ has the definitions given above for $X^-$.

An example of Compound (ii) is 1-oleylamidoethyl-2-oleylimidazolinium chloride wherein $R^1$ is an acyclic aliphatic $C_{15}$–$C_{17}$ hydrocarbon group, $R^2$ is an ethylene group, G is a NH group, $R^5$ is a methyl group and $A^-$ is a chloride anion.

(iii)- softener having the formula:

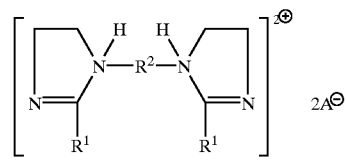

wherein R, $R^1$, $R^2$, and $A^-$ are defined as above.

An example of Compound (iii) is the compound having the formula:

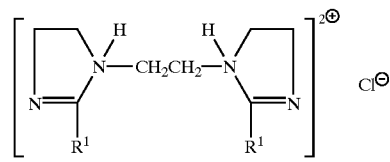

wherein $R^1$ is derived from oleic acid.

Additional fabric softening materials may be used in addition or alternatively to the cationic fabric softener. These may be selected from nonionic, amphoteric or anionic fabric softening material. Disclosure of such materials may be found in U.S. Pat. Nos. 4,327,133; 4,421,792; 4,426,299; 4,460,485; 3,644,203; 4,661,269; 4,439,335; 3,861,870; 4,308,151; 3,886,075; 4,233,164; 4,401,578; 3,974,076; 4,237,016 and EP 472,178.

Typically, such nonionic fabric softener materials have an HLB of from 2 to 9, more typically from 3 to 7. Such nonionic fabric softener materials tend to be readily dispersed either by themselves, or when combined with other materials such as single-long-chain alkyl cationic surfactant described in detail hereinafter. Dispersibility can be improved by using more single-long-chain alkyl cationic surfactant, mixture with other materials as set forth hereinafter, use of hotter water, and/or more agitation. In general, the materials selected should be relatively crystalline, higher melting, (e.g. >40° C.) and relatively water-insoluble.

Preferred nonionic softeners are fatty acid partial esters of polyhydric alcohols, or anhydrides thereof, wherein the alcohol, or anhydride, contains from 2 to 18, preferably from 2 to 8, carbon atoms, and each fatty acid moiety contains from 12 to 30, preferably from 16 to 20, carbon atoms. Typically, such softeners contain from one to 3, preferably 2 fatty acid groups per molecule.

The polyhydric alcohol portion of the ester can be ethylene glycol, glycerol, poly (e.g., di-, tri-, tetra, penta-, and/or hexa-) glycerol, xylitol, sucrose, erythritol, pentaerythritol, sorbitol or sorbitan. Sorbitan esters and polyglycerol monostearate are particularly preferred.

The fatty acid portion of the ester is normally derived from fatty acids having from 12 to 30, preferably from 16 to 20, carbon atoms, typical examples of said fatty acids being lauric acid, myristic acid, palmitic acid, stearic acid and behenic acid. Highly preferred optional nonionic softening agents for use in the present invention are the sorbitan esters, which are esterified dehydration products of sorbitol, and the glycerol esters.

Commercial sorbitan monostearate is a suitable material. Mixtures of sorbitan stearate and sorbitan palmitate having stearate/palmitate weight ratios varying between 10:1 and 1:10, and 1,5-sorbitan esters are also useful.

Glycerol and polyglycerol esters, especially glycerol, diglycerol, triglycerol, and polyglycerol mono- and/or di-esters, preferably mono-, are preferred herein (e.g. polyglycerol monostearate with a trade name of Radiasurf 7248).

Useful glycerol and polyglycerol esters include monoesters with stearic, oleic, palmitic, lauric, isostearic, myristic, and/or behenic acids and the diesters of stearic, oleic, palmitic, lauric, isostearic, behenic, and/or myristic acids. It is understood that the typical mono-ester contains some di- and tri-ester, etc.

The "glycerol esters" also include the polyglycerol, e.g., diglycerol through octaglycerol esters. The polyglycerol polyols are formed by condensing glycerin or epichlorohydrin together to link the glycerol moieties via ether linkages. The mono- and/or diesters of the polyglycerol polyols are preferred, the fatty acyl groups typically being those described hereinbefore for the sorbitan and glycerol esters.

Further fabric softening components suitable for use herein are the softening clays, such as the low ion-exchange-capacity ones described in EP-A-0,150,531.

Of course, the term "softening active" can also encompass mixed softening active agents.

Preferred among the classes of softener compounds disclosed herein before are the diester or diamido quaternary ammonium fabric softening active compound (DEQA).

The fabric softener compounds herein are present at levels of from 1% to 80% of compositions herein, depending on the composition execution which can be dilute with a preferred level of active from 5% to 15%, or concentrated, with a preferred level of active from 15% to 50%, most preferably 15% to 35% by weight of the composition.

Fully formulated laundry and cleaning compositions such as a softening composition preferably contain, in addition to the hereinbefore described components, one or more of the following ingredients.

(A) Brighteners

The compositions herein can also optionally contain from 0.005% to 5% by weight of certain types of hydrophilic optical brighteners which also provide a dye transfer inhibition action. If used, the compositions herein will preferably comprise from 0.001% to 1% by weight of such optical brighteners. The hydrophilic optical brighteners useful in the present invention are those having the structural formula:

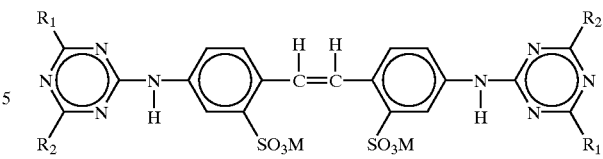

wherein $R_1$ is selected from anilino, N-2-bis-hydroxyethyl and NH-2-hydroxyethyl; $R_2$ is selected from N-2-bis-hydroxyethyl, N-2-hydroxyethyl-N-methylamino, morphilino, chloro and amino; and M is a salt-forming cation such as sodium or potassium.

When in the above formula, $R_1$ is anilino, $R_2$ is N-2-bis-hydroxyethyl and M is a cation such as sodium, the brightener is 4,4',-bis[(4-anilino-6-(N-2-bis-hydroxyethyl)-s-triazine-2-yl)amino]-2,2'-stilbenedisulfonic acid and disodium salt. This particular brightener species is commercially marketed under the tradename Tinopal-UNPA-GX® by Ciba-Geigy Corporation. Tinopal-UNPA-GX is the preferred hydrophilic optical brightener useful in the rinse added compositions herein.

When in the above formula, $R_1$ is anilino, $R_2$ is N-2-hydroxyethyl-N-2-methylamino and M is a cation such as sodium, the brightener is 4,4'-bis[(4-anilino-6-(N-2-hydroxyethyl-N-methylamino)-s-triazine-2-yl)amino]2,2'-stilbenedisulfonic acid disodium salt. This particular brightener species is commercially marketed under the tradename Tinopal 5BM-GX® by Ciba-Geigy Corporation.

When in the above formula, $R_1$ is anilino, $R_2$ is morphilino and M is a cation such as sodium, the brightener is 4,4'-bis[(4-anilino-6-morphilino-s-triazine-2-yl)amino]2,2'-stilbenedisulfonic acid, sodium salt. This particular brightener species is commercially marketed under the tradename Tinopal AMS-GX® by Ciba Geigy Corporation.

(B) Dispersibility Aids

Relatively concentrated compositions containing both saturated and unsaturated diester quaternary ammonium compounds can be prepared that are stable without the addition of concentration aids. However, the compositions of the present invention may require organic and/or inorganic concentration aids to go to even higher concentrations and/or to meet higher stability standards depending on the other ingredients. These concentration aids which typically can be viscosity modifiers may be needed, or preferred, for ensuring stability under extreme conditions when particular softener active levels are used. The surfactant concentration aids are typically selected from the group consisting of (1) single long chain alkyl cationic surfactants; (2) nonionic surfactants; (3) amine oxides; (4) fatty acids; and (5) mixtures thereof. These aids are described in WO 94/20597, specifically on page 14, line 12 to page 20, line 12, which is herein incorporated by reference.

When said dispersibility aids are present, the total level is from 2% to 25%, preferably from 3% to 17%, more preferably from 4% to 15%, and even more preferably from 5% to 13% by weight of the composition. These materials can either be added as part of the active softener raw material, (I), e.g., the mono-long chain alkyl cationic surfactant and/or the fatty acid which are reactants used to form the biodegradable fabric softener active as discussed hereinbefore, or added as a separate component. The total level of dispersibility aid includes any amount that may be present as part of component (I).

(1) Mono-Alkyl Cationic Quaternary Ammonium Compound

When the mono-alkyl cationic quaternary ammonium compound is present, it is typically present at a level of from 2% to 25%, preferably from 3% to 17%, more preferably from 4% to 15%, and even more preferably from 5% to 13% by weight of the composition, the total mono-alkyl cationic quaternary ammonium compound being at least at an effective level.

Such mono-alkyl cationic quaternary ammonium compounds useful in the present invention are, preferably, quaternary ammonium salts of the general formula:

$$[R^4N^+(R^5)_3]X^-$$

wherein
- $R^4$ is $C_8-C_{22}$ alkyl or alkenyl group, preferably $C_{10}-C_{18}$ alkyl or alkenyl group; more preferably $C_{10}-C_{14}$ or $C_{16}-C_{18}$ alkyl or alkenyl group;
- each $R^5$ is a $C_1-C_6$ alkyl or substituted alkyl group (e.g., hydroxy alkyl), preferably $C_1-C_3$ alkyl group, e.g., methyl (most preferred), ethyl, propyl, and the like, a benzyl group, hydrogen, a polyethoxylated chain with from 2 to 20 oxyethylene units, preferably from 2.5 to 13 oxyethylene units, more preferably from 3 to 10 oxyethylene units, and mixtures thereof; and
- $X^-$ is as defined hereinbefore for (Formula (I)).

Especially preferred dispersibility aids are monolauryl trimethyl ammonium chloride and monotallow trimethyl ammonium chloride available from Witco under the trade names Adogen® 412 and Adogen® 471, monooleyl or monocanola trimethyl ammonium chloride available from Witco under the tradename Adogen® 417, monococonut trimethyl ammonium chloride available from Witco under the trade name Adogen® 461, and monosoya trimethyl ammonium chloride available from Witco under the trade name Adogen® 415.

The $R^4$ group can also be attached to the cationic nitrogen atom through a group containing one, or more, ester, amide, ether, amine, etc., linking groups which can be desirable for increased concentratability of component (I), etc. Such linking groups are preferably within from one to three carbon atoms of the nitrogen atom.

Mono-alkyl cationic quaternary ammonium compounds also include $C_8-C_{22}$ alkyl choline esters. The preferred dispersibility aids of this type have the formula:

$$R^1C(O)-O-CH_2CH_2N^+(R)_3X^-$$

wherein $R^1$, R and $X^-$ are as defined previously.

Highly preferred dispersibility aids include $C_{12}-C_{14}$ coco choline ester and $C_{16}-C_{18}$ tallow choline ester.

Suitable biodegradable single-long-chain alkyl dispersibility aids containing an ester linkage in the long chains are described in U.S. Pat. No. 4,840,738, said patent being incorporated herein by reference.

When the dispersibility aid comprises alkyl choline esters, preferably the compositions also contain a small amount, preferably from 2% to 5% by weight of the composition, of organic acid. Organic acids are described in EP.404,471, which is herein incorporated by reference. Preferably the organic acid is selected from the group consisting of glycolic acid, acetic acid, citric acid, and mixtures thereof.

Ethoxylated quaternary ammonium compounds which can serve as the dispersibility aid include ethylbis (polyethoxy ethanol)alkylammonium ethyl-sulfate with 17 moles of ethylene oxide, available under the trade name Variquat® 66 from Witco Corporation; polyethylene glycol (15) oleammonium chloride, available under the trade name Ethoquad® O/25 from Akzo; and polyethylene glycol (15) cocomonium chloride, available under the trade name Ethoquad® C/25 from Akzo.

Quaternary compounds having only a single long alkyl chain, can protect the cationic softener from interacting with anionic surfactants and/or detergent builders that are carried over into the rinse from the wash solution.

(2) Nonionic Surfactant (Alkoxylated Materials)

Suitable nonionic surfactants to serve as the viscosity/dispersibility modifier include addition products of ethylene oxide and, optionally, propylene oxide, with fatty alcohols, fatty acids, fatty amines, etc. They are referred to herein as ethoxylated fatty alcohols, ethoxylated fatty acids, and ethoxylated fatty amines. Any of the alkoxylated materials of the particular type described hereinafter can be used as the nonionic surfactant. In general terms, the nonionics herein, when used alone, in liquid compositions are at a level of from 0% to 5%, preferably from 0.1% to 5%, more preferably from 0.2% to 3%. Suitable compounds are substantially water-soluble surfactants of the general formula:

$$R^2-Y-(C_2H_4O)_z-C_2H_4OH$$

wherein $R^2$ for both solid and liquid compositions is selected from the group consisting of primary, secondary and branched chain alkyl and/or acyl hydrocarbyl groups; primary, secondary and branched chain alkenyl hydrocarbyl groups; and primary, secondary and branched chain alkyl- and alkenyl-substituted phenolic hydrocarbyl groups; said hydrocarbyl groups having a hydrocarbyl chain length of from 8 to 20, preferably from 10 to 18 carbon atoms. More preferably the hydrocarbyl chain length for liquid compositions is from 16 to 18 carbon atoms and for solid compositions from 10 to 14 carbon atoms. In the general formula for the ethoxylated nonionic surfactants herein, Y is typically —O—, —C(O)O—, —C(O)N(R)—, or —C(O)N(R)R—, preferably —O—, and in which $R^2$, and R, when present, have the meanings given hereinbefore, and/or R can be hydrogen, and z is at least 8, preferably at least 10–11. Performance and, usually, stability of the softener composition decrease when fewer ethoxylate groups are present.

The nonionic surfactants herein are characterized by an HLB (hydrophilic-lipophilic balance) of from 7 to 20, preferably from 8 to 15. Of course, by defining $R^2$ and the number of ethoxylate groups, the HLB of the surfactant is, in general, determined. However, it is to be noted that the nonionic ethoxylated surfactants useful herein, for concentrated liquid compositions, contain relatively long chain $R^2$ groups and are relatively highly ethoxylated. While shorter alkyl chain surfactants having short ethoxylated groups can possess the requisite HLB, they are not as effective herein. Nonionic surfactants as the viscosity/dispersibility modifiers are preferred over the other modifiers disclosed herein for compositions with higher levels of perfume.

Examples of nonionic surfactants follow. The nonionic surfactants of this invention are not limited to these examples. In the examples, the integer defines the number of ethoxy (EO) groups in the molecule.

(3) Amine Oxides

Suitable amine oxides include those with one alkyl or hydroxyalkyl moiety of 8 to 22 carbon atoms, preferably from 10 to 18 carbon atoms, more preferably from 8 to 14 carbon atoms, and two alkyl moieties selected from the group consisting of alkyl groups and hydroxyalkyl groups with 1 to 3 carbon atoms.

Examples include dimethyloctylamine oxide, diethyidecylamine oxide, bis-(2-hydroxyethyl)dodecyl-amine oxide, dimethyldodecylamine oxide, dipropyl-tetradecylamine oxide, methylethylhexadecylamine oxide, dimethyl-2-hydroxyoctadecylamine oxide, and coconut fatty alkyl dimethylamine oxide.

(C) Stabilizers

Stabilizers can be present in the compositions of the present invention. The term "stabilizer," as used herein, includes antioxidants and reductive agents. These agents are present at a level of from 0% to 2%, preferably from 0.01% to 0.2%, more preferably from 0.035% to 0.1% for antioxidants, and more preferably from 0.01% to 0.2% for reductive agents. These assure good odor stability under long term storage conditions. Antioxidants and reductive agent stabilizers are especially critical for unscented or low scent products (no or low perfume). Examples of antioxidants that can be added to the compositions of this invention include a mixture of ascorbic acid, ascorbic palmitate, propyl gallate, available from Eastman Chemical Products, Inc., under the trade names Tenox® PG and Tenox® S-1; a mixture of BHT (butylated hydroxytoluene), BHA (butylated hydroxyanisole), propyl gallate, and citric acid, available from Eastman Chemical Products, Inc., under the trade name Tenox®-6; butylated hydroxytoluene, available from UOP Process Division under the trade name Sustane® BHT; tertiary butylhydroquinone, Eastman Chemical Products, Inc., as Tenox® TBHQ; natural tocopherols, Eastman Chemical Products, Inc., as Tenox® GT-1/GT-2; and butylated hydroxyanisole, Eastman Chemical Products, Inc., as BHA; long chain esters ($C_8$–$C_{22}$) of gallic acid, e.g., dodecyl gallate; Irganox® 1010; Irganox® 1035; Irganox® B 1171; Irganox® 1425; Irganox® 3114; Irganox® 3125; and mixtures thereof; preferably Irganox® 3125, Irganox® 1425, Irganox® 3114, and mixtures thereof; more preferably Irganox® 3125 alone or mixed with citric acid and/or other chelators such as isopropyl citrate, Dequest® 2010, available from Monsanto with a chemical name of 1-hydroxyethylidene-1, 1-diphosphonic acid (etidronic acid), and Tiron®), available from Kodak with a chemical name of 4,5-dihydroxy-m-benzene-sulfonic acid/sodium salt, and DTPA®, available from Aldrich with a chemical name of diethylenetriaminepentaacetic acid.

(D) Soil Release Agent

In the present invention, an optional soil release agent can be added. The addition of the soil release agent can occur in combination with the premix, in combination with the acid/water seat, before or after electrolyte addition, or after the final composition is made. The softening composition prepared by the process of the present invention herein can contain from 0% to 10%, preferably from 0.2% to 5%, of a soil release agent. Preferably, such a soil release agent is a polymer. Polymeric soil release agents useful in the present invention include copolymeric blocks of terephthalate and polyethylene oxide or polypropylene oxide, and the like.

A preferred soil release agent is a copolymer having blocks of terephthalate and polyethylene oxide. More specifically, these polymers are comprised of repeating units of ethylene terephthalate and polyethylene oxide terephthalate at a molar ratio of ethylene terephthalate units to polyethylene oxide terephthalate units of from 25:75 to 35:65, said polyethylene oxide terephthalate containing polyethylene oxide blocks having molecular weights of from 300 to 2000. The molecular weight of this polymeric soil release agent is in the range of from 5,000 to 55,000.

Another preferred polymeric soil release agent is a crystallizable polyester with repeat units of ethylene terephthalate units containing from 10% to 15% by weight of ethylene terephthalate units together with from 10% to 50% by weight of polyoxyethylene terephthalate units, derived from a polyoxyethylene glycol of average molecular weight of from 300 to 6,000, and the molar ratio of ethylene terephthalate units to polyoxyethylene terephthalate units in the crystallizable polymeric compound is between 2:1 and 6:1. Examples of this polymer include the commercially available materials Zelcon 4780® (from Dupont) and Milease T® (from ICI).

Highly preferred soil release agents are polymers of the generic formula:

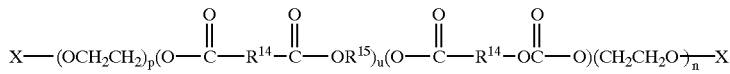

in which each X can be a suitable capping group, with each X typically being selected from the group consisting of H, and alkyl or acyl groups containing from 1 to 4 carbon atoms. p is selected for water solubility and generally is from 6 to 113, preferably from 20 to 50. u is critical to formulation in a liquid composition having a relatively high ionic strength. There should be very little material in which u is greater than 10. Furthermore, there should be at least 20%, preferably at least 40%, of material in which u ranges from 3 to 5.

The $R^{14}$ moieties are essentially 1,4-phenylene moieties. As used herein, the term "the $R^{14}$ moieties are essentially 1,4-phenylene moieties" refers to compounds where the $R^{14}$ moieties consist entirely of 1,4-phenylene moieties, or are partially substituted with other arylene or alkarylene moieties, alkylene moieties, alkenylene moieties, or mixtures thereof. Arylene and alkarylene moieties which can be partially substituted for 1,4-phenylene include 1,3-phenylene, 1,2-phenylene, 1,8-naphthylene, 1,4-naphthylene, 2,2-biphenylene, 4,4-biphenylene, and mixtures thereof. Alkylene and alkenylene moieties which can be partially substituted include 1,2-propylene, 1,4-butylene, 1,5-pentylene, 1,6-hexamethylene, 1,7-heptamethylene, 1,8-octamethylene, 1,4-cyclohexylene, and mixtures thereof.

For the $R^{14}$ moieties, the degree of partial substitution with moieties other than 1,4-phenylene should be such that the soil release properties of the compound are not adversely affected to any great extent. Generally the degree of partial substitution which can be tolerated will depend upon the backbone length of the compound, i.e., longer backbones can have greater partial substitution for 1,4-phenylene moieties. Usually, compounds where the $R^{14}$ comprise from 50% to 100% 1,4-phenylene moieties (from 0% to 50% moieties other than 1,4-phenylene) have adequate soil release activity. For example, polyesters made according to the present invention with a 40:60 mole ratio of isophthalic (1,3-phenylene) to terephthalic (1,4-phenylene) acid have adequate soil release activity. However, because most polyesters used in fiber making comprise ethylene terephthalate units, it is usually desirable to minimize the degree of partial substitution with moieties other than 1,4-phenylene for best soil release activity. Preferably, the $R^{14}$ moieties consist entirely of (i.e., comprise 100%) 1,4-phenylene moieties, i.e., each $R^{14}$ moiety is 1,4-phenylene.

For the $R^{15}$ moieties, suitable ethylene or substituted ethylene moieties include ethylene, 1,2-propylene, 1,2-butylene, 1,2-hexylene, 3-methoxy-1,2-propylene, and mixtures thereof. Preferably, the $R^{15}$ moieties are essentially ethylene moieties, 1,2-propylene moieties, or mixtures thereof. Inclusion of a greater percentage of ethylene moieties tends to improve the soil release activity of compounds. Surprisingly, inclusion of a greater percentage of 1,2-propylene moieties tends to improve the water solubility of compounds.

Therefore, the use of 1,2-propylene moieties or a similar branched equivalent is desirable for incorporation of any substantial part of the soil release component in the liquid fabric softener compositions. Preferably, from 75% to 100%, are 1,2-propylene moieties.

The value for each p is at least 6, and preferably is at least 10. The value for each n usually ranges from 12 to 113. Typically the value for each p is in the range of from 12 to 43.

A more complete disclosure of soil release agents is contained in U.S. Pat. Nos.: 4,661,267; 4,711,730; 4,749,596; 4,818,569; 4,877,896; 4,956,447; and U.S. Pat. No. 4,976,879, all of said patents being incorporated herein by reference.

These soil release agents can also act as scum dispersants.

(E) Scum Dispersant

In the present invention, the premix can be combined with an optional scum dispersant, other than the soil release agent, and heated to a temperature at or above the melting point(s) of the components.

The preferred scum dispersants herein are formed by highly ethoxylating hydrophobic materials. The hydrophobic material can be a fatty alcohol, fatty acid, fatty amine, fatty acid amide, amine oxide, quaternary ammonium compound, or the hydrophobic moieties used to form soil release polymers. The preferred scum dispersants are highly ethoxylated, e.g., more than 17, preferably more than 25, more preferably more than 40, moles of ethylene oxide per molecule on the average, with the polyethylene oxide portion being from 76% to 97%, preferably from 81% to 94%, of the total molecular weight.

The level of scum dispersant is sufficient to keep the scum at an acceptable, preferably unnoticeable to the consumer, level under the conditions of use, but not enough to adversely affect softening. For some purposes it is desirable that the scum is nonexistent. Depending on the amount of anionic or nonionic detergent, etc., used in the wash cycle of a typical laundering process, the efficiency of the rinsing steps prior to the introduction of the compositions herein, and the water hardness, the amount of anionic or nonionic detergent surfactant and detergency builder (especially phosphates and zeolites) entrapped in the fabric (laundry) will vary. Normally, the minimum amount of scum dispersant should be used to avoid adversely affecting softening properties. Typically scum dispersion requires at least 2%, preferably at least 4% (at least 6% and preferably at least 10% for maximum scum avoidance) based upon the level of softener active. However, at levels of 10% (relative to the softener material) or more, one risks loss of softening efficacy of the product especially when the fabrics contain high proportions of nonionic surfactant which has been absorbed during the washing operation.

Preferred scum dispersants are: Brij 700®; Varonic U-250®; Genapol T-500®, Genapol T-800®; Plurafac A-79®; and Neodol 25–50®.

(F) Bactericides

Examples of bactericides used in the compositions of this invention include glutaraldehyde, formaldehyde, 2-bromo-2-nitro-propane-1,3-diol sold by Inolex Chemicals, located in Philadelphia, Pennsylvania, under the trade name Bronopol®, and a mixture of 5-chloro-2-methyl-4-isothiazoline-3-one and 2-methyl-4-isothiazoline-3-one sold by Rohm and Haas Company under the trade name Kathon 1 to 1,000 ppm by weight of the agent.

(G) Perfume

The present invention can contain any softener compatible perfume. Suitable perfumes are disclosed in U.S. Pat. No. 5,500,138, said patent being incorporated herein by reference.

As used herein, perfume includes fragrant substance or mixture of substances including natural (i.e., obtained by extraction of flowers, herbs, leaves, roots, barks, wood, blossoms or plants), artificial (i.e., a mixture of different nature oils or oil constituents) and synthetic (i.e., synthetically produced) odoriferous substances. Such materials are often accompanied by auxiliary materials, such as fixatives, extenders, stabilizers and solvents. These auxiliaries are also included within the meaning of "perfume", as used herein. Typically, perfumes are complex mixtures of a plurality of organic compounds.

Examples of perfume ingredients useful in the perfumes of the present invention compositions include, but are not limited to, hexyl cinnamic aldehyde; amyl cinnamic aldehyde; amyl salicylate; hexyl salicylate; terpineol; 3,7-dimethyl-cis-2,6-octadien-1-ol; 2,6-dimethyl-2-octanol; 2,6-dimethyl-7-octen-2-ol; 3,7-dimethyl-3-octanol; 3,7-dimethyl-trans-2,6-octadien-1-ol; 3,7-dimethyl-6-octen-1-ol; 3,7-dimethyl-1-octanol; 2-methyl-3-(para-tert-butylphenyl)-propionaldehyde; 4-(4-hydroxy-4-methylpentyl)-3-cyclohexene-1-carboxaldehyde; tricyclodecenyl propionate; tricyclodecenyl acetate; anisaldehyde; 2-methyl-2-(para-iso-propylphenyl)-propionaldehyde; ethyl-3-methyl-3-phenyl glycidate; 4-(para-hydroxyphenyl)-butan-2-one; 1-(2,6,6-trimethyl-2-cyclohexen-1-yl)-2-bute n-1-one; para-methoxyacetophenone; para-methoxy-alpha-phenylpropene; methyl-2-n-hexyl-3-oxo-cyclopentane carboxylate; undecalactone gamma.

Additional examples of fragrance materials include, but are not limited to, orange oil; lemon oil; grapefruit oil; bergamot oil; clove oil; dodecalactone gamma; methyl-2-(2-pentyl-3-oxo-cyclopentyl) acetate; beta-naphthol methylether; methyl-beta-naphthylketone; coumarin; decylaldehyde; benzaldehyde; 4-tert-butylcyclohexyl acetate; alpha, alpha-dimethylphenethyl acetate; methylphenylcarbinyl acetate; Schiffs base of 4-(4-hydroxy-4-methylpentyl)-3-cyclohexene-1-carboxaldehyde and methyl anthranilate; cyclic ethyleneglycol diester of tridecandioic acid; 3,7-dimethyl-2,6-octadiene-1-nitrile; ionone gamma methyl; ionone alpha; ionone beta; petitgrain; methyl cedrylone; 7-acetyl-1,2,3,4,5,6,7,8-octahydro-1,1,6,7-tetramethyl-naphthalene; ionone methyl; methyl-1,6,10-trimethyl-2,5,9-cyclododecatrien-1-yl ketone; 7-acetyl-1,1,3,4,4,6-hexamethyl tetralin; 4-acetyl-6-tert-butyl-1,1-dimethyl indane; benzophenone; 6-acetyl-1,1,2,3,3,5-hexamethyl indane; 5-acetyl-3-isopropyl-1,1,2,6-tetramethyl indane;

1-dodecanal; 7-hydroxy-3,7-dimethyl octanal; 10-undecen-1-al; iso-hexenyl cyclohexyl carboxaldehyde; formyl tricyclodecan; cyclopentadecanolide; 16-hydroxy-9-hexadecenoic acid lactone; 1,3,4,6,7,8-hexahydro-4,6,6,7,8,8-hexamethylcyclopenta-gamma-2-benzopyrane; ambroxane; dodecahydro-3a,6,6,9a-tetramethyinaphtho-[2,1b]furan; cedrol; 5-(2,2,3-trimethylcyclopent-3-enyl)-3-methylpentan-2-ol; 2-ethyl-4-(2,2,3-trimethyl-3-cyclopenten-1-yl)-2-buten-1-ol; caryophyllene alcohol; cedryl acetate; para-tert-butylcyclohexyl acetate; patchouli; olibanum resinoid; labdanum; vetivert; copaiba balsam; fir balsam; and condensation products of: hydroxycitronellal and methyl anthranilate; hydroxycitronellal and indol; phenyl acetaldehyde and indol; 4-(4-hydroxy-4-methyl pentyl)-3-cyclohexene-1-carboxaldehyde and methyl anthranilate. More examples of perfume components are geraniol; geranyl acetate; linalool; linalyl acetate; tetrahydrolinalool; citronellol; citronellyl acetate; dihydromyrcenol; dihydromyrcenyl acetate; tetrahydromyrcenol; terpinyl acetate; nopol; nopyl acetate; 2-phenylethanol; 2-phenylethyl acetate; benzyl alcohol; benzyl acetate; benzyl salicylate; benzyl benzoate; styrallyl acetate; dimethylbenzylcarbinol; trichloromethylphenylcarbinyl methylphenylcarbinyl acetate; isononyl acetate; vetiveryl acetate; vetiverol; 2-methyl-3-(p-tert-butylphenyl)-propanal; 2-methyl-3-(p-isopropylphenyl)-propanal; 3-(p-tert-butylphenyl)-propanal; 4-(4-methyl-3-pentenyl)-3-cyclohexenecarbaldehyde; 4-acetoxy-3-pentyltetrahydropyran; methyl dihydrojasmonate; 2-n-heptylcyclopentanone; 3-methyl-2-pentyl-cyclopentanone; n-decanal; n-dodecanal; 9-decenol-1; phenoxyethyl isobutyrate; phenylacetaldehyde dimethylacetal; phenylacetaldehyde diethylacetal; geranonitrile; citronellonitrile; cedryl acetal; 3-isocamphylcyclohexanol; cedryl methylether; isolongifolanone; aubepine nitrile; aubepine; heliotropine; eugenol; vanillin; diphenyl oxide; hydroxycitronellal ionones; methyl ionones; isomethyl ionomes; irones; cis-3-hexenol and esters thereof; indane musk fragrances; tetralin musk fragrances; isochroman musk fragrances; macrocyclic ketones; macrolactone musk fragrances; ethylene brassylate.

The perfumes useful in the present invention compositions are substantially free of halogenated materials and nitromusks.

Suitable solvents, diluents or carriers for perfumes ingredients mentioned above are for examples, ethanol, isopropanol, diethylene glycol, monoethyl ether, dipropylene glycol, diethyl phthalate, triethyl citrate, etc. The amount of such solvents, diluents or carriers incorporated in the perfumes is preferably kept to the minimum needed to provide a homogeneous perfume solution. Perfume can be present at a level of from 0% to 10%, preferably from 0.1% to 5%, and more preferably from 0.2% to 3%, by weight of the finished composition. Fabric softener compositions of the present invention provide improved fabric perfume deposition.

(H) Chelating Agents

The compositions and processes herein can optionally employ one or more copper and/or nickel chelating agents ("chelators"). Such water-soluble chelating agents can be selected from the group consisting of amino carboxylates, amino phosphonates, polyfunctionally-substituted aromatic chelating agents and mixtures thereof, all as hereinafter defined. The whiteness and/or brightness of fabrics are substantially improved or restored by such chelating agents and the stability of the materials in the compositions are improved.

Amino carboxylates useful as chelating agents herein include ethylenedi-aminetetraacetates (EDTA), N-hydroxyethylethylenediaminetriacetates, nitrilotriacetates (NTA), ethylenediamine tetraprionates, ethylenediamine-N,N'-diglutamates, 2-hyroxypropylenediamine-N,N'-disuccinates, triethylenetetraaminehexacetates, diethylenetriaminepentaacetates (DETPA), and ethanoldiglycines, including their water-soluble salts such as the alkali metal, ammonium, and substituted ammonium salts thereof and mixtures thereof.

Amino phosphonates are also suitable for use as chelating agents in the compositions of the invention when at least low levels of total phosphorus are permitted in detergent compositions, and include ethylenediaminetetrakis (methylenephosphonates), diethylenetriamine-N,N,N',N", N"-pentakis(methane phosphonate) (DETMP) and 1-hydroxyethane-1,1-diphosphonate (HEDP). Preferably, these amino phosphonates to not contain alkyl or alkenyl groups with more than 6 carbon atoms.

The chelating agents are typically used in the present rinse process at levels from 2 ppm to 25 ppm, for periods from 1 minute up to several hours soaking. The preferred EDDS chelator used herein (also known as ethylenediamine-N,N'-disuccinate) is the material described in U.S. Pat. No. 4,704,233.

As can be seen from the foregoing, a wide variety of chelators can be used herein. Indeed, simple polycarboxylates such as citrate, oxydisuccinate, and the like, can also be used, although such chelators are not as effective as the amino carboxylates and phosphonates, on a weight basis. Accordingly, usage levels may be adjusted to take into account differing degrees of chelating effectiveness. The chelators herein will preferably have a stability constant (of the fully ionized chelator) for copper ions of at least 5, preferably at least 7. Typically, the chelators will comprise from 0.5% to 10%, more preferably from 0.75% to 5%, by weight of the compositions herein. Preferred chelators include DETMP, DETPA, NTA, EDDS and mixtures thereof.

(I)-Enzyme

The compositions and processes herein can optionally employ one or more enzymes such as lipases, proteases, cellulase, amylases and peroxidases. A preferred enzyme for use herein is a cellulase enzyme. Indeed, this type of enzyme will further provide a color care benefit to the treated fabric. Cellulases usable herein include both bacterial and fungal types, preferably having a pH optimum between 5 and 9.5. U.S. Pat. No. 4,435,307 discloses suitable fungal cellulases from *Humicola insolens* or Humicola strain DSM1800 or a cellulase 212-producing fungus belonging to the genus Aeromonas, and cellulase extracted from the hepatopancreas of a marine mollusk, Dolabella Auricula Solander. Suitable cellulases are also disclosed in GB-A-2.075.028; GB-A-2.095.275 and DE-OS-2.247.832. CAREZYME® and CELLUZYME® (Novo) are especially useful. Other suitable cellulases are also disclosed in WO 91/17243 to Novo, WO 96/34092, WO 96/34945 and EP-A-0,739,982. In practical terms for current commercial preparations, typical amounts are up to 5 mg by weight, more typically 0.01 mg to 3 mg, of active enzyme per gram of the detergent composition. Stated otherwise, the compositions herein will typically comprise from 0.001% to 5%, preferably 0.01%–1% by weight of a commercial enzyme preparation. In the particular cases where activity of the enzyme preparation can be defined otherwise such as with cellulases, corresponding activity units are preferred (e.g. CEVU or cellulase Equivalent Viscosity Units). For instance, the compositions of the present invention can contain cellulase enzymes at a level equivalent to an activity from 0.5 to 1000 CEVU/gram of composition. Cellulase enzyme preparations used for the purpose of formulating the compositions of this invention typically have an activity comprised between 1,000 and 10,000 CEVU/gram in liquid form, around 1,000 CEVU/gram in solid form.

(J) Liquid Carrier

Another optional, but preferred, ingredient is a liquid carrier. The liquid carrier employed in the instant compositions is preferably at least primarily water due to its low cost, relative availability, safety, and environmental compatibility. The level of water in the liquid carrier is preferably at least 50%, most preferably at least 60%, by weight of the carrier. Mixtures of water and low molecular weight, e.g., <200, organic solvent, e.g., lower alcohols such as ethanol, propanol, isopropanol or butanol are useful as the carrier liquid. Low molecular weight alcohols include monohydric, dihydric (glycol, etc.) trihydric (glycerol, etc.), and higher polyhydric (polyols) alcohols.

(K) Other ODtional Ingredients

The present invention can include optional components conventionally used in textile treatment compositions, for example: colorants; preservatives; surfactants; anti-shrinkage agents; fabric crisping agents; spotting agents; germicides; fungicides; anti-oxidants such as butylated hydroxy toluene, anti-corrosion agents, and the like.

The present invention can also include other compatible ingredients, including those as disclosed in WO96/02625, WO96/21714, and WO96121715. Various other optional adjunct ingredients may also be used to provide fully-formulated detergent compositions. The following ingredients are described for the convenience of the formulator, but are not intended to be limiting thereof.

Detersive Surfactants

Non-limiting examples of surfactants useful herein typically at levels from 1% to 55%, by weight, include the conventional $C_{11}$–$C_{18}$ alkyl benzene sulfonates ("LAS") and primary, branched-chain and random $C_{10}$–$C_{20}$ alkyl sulfates ("AS"), the $C_{10}$–$C_{18}$ secondary (2,3) alkyl sulfates of the formula $CH_3(CH_2)_x(CHOSO_3^-M^+) CH_3$ and $CH_3(CH_2)_y (CHOSO_3^-M^+) CH_2CH_3$ where x and (y+1) are integers of at least 7, preferably at least 9, and M is a water-solubilizing cation, especially sodium, unsaturated sulfates such as oleyl sulfate, the $C_{10}$–$C_{18}$ alkyl alkoxy sulfates ("$AE_xS$"; especially x up to 7 EO ethoxy sulfates), $C_{10}$–$C_{18}$ alkyl alkoxy carboxylates (especially the EO 1–5 ethoxycarboxylates), the $C_{10-18}$ glycerol ethers, the $C_{10}$–$C_{18}$ alkyl polyglycosides and their corresponding sulfated polyglycosides, and $C_{12}$–$C_{18}$ alpha-sulfonated fatty acid esters. If desired, the conventional nonionic and amphoteric surfactants such as the $C_{12}$–$C_{18}$ alkyl ethoxylates ("AE") including the so-called narrow peaked alkyl ethoxylates and $C_6$–$C_{12}$ alkyl phenol alkoxylates (especially ethoxylates and mixed ethoxy/propoxy), $C_{12}$–$C_{18}$ betaines and sulfobetaines ("sultaines"), $C_{10}$–$C_{18}$ amine oxides, cationic surfactants and the like, can also be included in the overall compositions. The $C_{10}$–$C_{18}$ N-alkyl polyhydroxy fatty acid amides can also be used. Typical examples include the $C_{12}$–$C_{18}$ N-methylglucamides. See WO 9,206,154. Other sugar-derived surfactants include the N-alkoxy polyhydroxy fatty acid amides, such as $C_{10}$–$C_{18}$ N-(3-methoxypropyl) glucamide. The N-propyl through N-hexyl $C_{12}$–$C_{18}$ glucamides can be used for low sudsing. $C_{10}$–$C_{20}$ conventional soaps may also be used. If high sudsing is desired, the branched-chain $C_{10}$–$C_{16}$ soaps may be used. Mixtures of anionic and nonionic surfactants are especially useful. Other conventional useful surfactants are listed in standard texts.

Builders

Detergent builders can optionally be included in the compositions herein to assist in controlling mineral hardness. Inorganic as well as organic builders can be used. Builders are typically used in fabric laundering compositions to assist in the removal of particulate soils.

The level of builder can vary widely depending upon the end use of the composition and its desired physical form. When present, the compositions will typically comprise at least 1% builder, preferably from 1% to 80%. Liquid formulations typically comprise from 5% to 50%, more typically 5% to 30%, by weight, of detergent builder. Granular formulations typically comprise from 1% to 80%, more typically from 5% to 50% by weight, of the detergent builder. Lower or higher levels of builder, however, are not meant to be excluded.

Inorganic or P-containing detergent builders include, but are not limited to, the alkali metal, ammonium and alkanolammonium salts of polyphosphates (exemplified by the tripolyphosphates, pyrophosphates, and glassy polymeric meta-phosphates), phosphonates, phytic acid, silicates, carbonates (including bicarbonates and sesquicarbonates), sulphates, and aluminosilicates. However, non-phosphate builders are required in some locales. Importantly, the compositions herein function surprisingly well even in the presence of the so-called "weak" builders (as compared with phosphates) such as citrate, or in the so-called "underbuilt" situation that may occur with zeolite or layered silicate builders.

Examples of silicate builders are the alkali metal silicates, particularly those having a $SiO_2$:$Na_2O$ ratio in the range 1.0:1 to 3.2:1 and layered silicates, such as the layered sodium silicates described in U.S. Pat. No. 4,664,839. NaSKS-6 is the trademark for a crystalline layered silicate marketed by Hoechst (commonly abbreviated herein as "SKS-6"). Unlike zeolite builders, the Na SKS-6 silicate builder does not contain aluminum. NaSKS-6 has the delta-$Na_2SiO_5$ morphology form of layered silicate. It can be prepared by methods such as those described in DE-A-3, 417,649 and DE-A-3,742,043. SKS-6 is a highly preferred layered silicate for use herein, but other such layered silicates, such as those having the general formula $NaMSi_xO_{2x+1}·yH_2O$ wherein M is sodium or hydrogen, x is a number from 1.9 to 4, preferably 2, and y is a number from 0 to 20, preferably 0 can be used herein. Various other layered silicates from Hoechst include NaSKS-5, NaSKS-7 and NaSKS-11, as the alpha, beta and gamma forms. As noted above, the delta-$Na_2SiO_5$ (NaSKS-6 form) is most preferred for use herein. Other silicates may also be useful such as for example magnesium silicate, which can serve as a crispening agent in granular formulations, as a stabilizing agent for oxygen bleaches, and as a component of suds control systems.

Examples of carbonate builders are the alkaline earth and alkali metal carbonates as disclosed in DE 2,321,001.

Aluminosilicate builders are useful in the present invention. Aluminosilicate builders are of great importance in most currently marketed heavy duty granular detergent compositions, and can also be a significant builder ingredient in liquid detergent formulations. Aluminosilicate builders include those having the empirical formula:

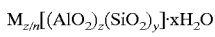

$M_{z/n}[(AlO_2)_z(SiO_2)_y] \cdot xH_2O$ wherein z and y are integers usually of at least 6, the molar ratio of z to y is in the range from 1.0 to 0, and x is an integer from 0 to 264, and M is a Group IA or IIA element, e.g., Na, K, Mg, Ca with valence n.

Useful aluminosilicate ion exchange materials are commercially available. These aluminosilicates can be crystalline or amorphous in structure and can be naturally-occurring aluminosilicates or synthetically derived. A method for producing aluminosilicate ion exchange materials is disclosed in U.S. Pat. No. 3,985,669. Preferred synthetic crystalline aluminosilicate ion exchange materials useful herein are available under the designations Zeolite A, Zeolite P (B), Zeolite MAP and Zeolite X. In an especially preferred embodiment, the crystalline aluminosilicate ion exchange material has the formula:

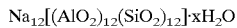

$Na_{12}[(AlO_2)_{12}(SiO_2)_{12}] \cdot xH_2O$ wherein x is from 20 to 30, especially. 27. This material is known as Zeolite A. Dehydrated zeolites (x=0–10) may also be used herein. Preferably, the aluminosilicate has a particle size of 0.1–10 microns in diameter.

Organic detergent builders suitable for the purposes of the present invention include, but are not restricted to, a wide variety of polycarboxylate compounds. As used herein, "polycarboxylate" refers to compounds having a plurality of carboxylate groups, preferably at least 3 carboxylates. Polycarboxylate builder can generally be added to the composition in acid form, but can also be added in the form of a neutralized salt. When utilized in salt form, alkali metals, such as sodium, potassium, and lithium, or alkanolammonium salts are preferred.

Included among the polycarboxylate builders are a variety of categories of useful materials. One important category of polycarboxylate builders encompasses the ether polycarboxylates, including oxydisuccinate, as disclosed in Berg, U.S. Pat. Nos. 3,128,287, 3,635,830. See also "TMS/TDS" builders of U.S. Pat. No. 4,663,071. Suitable ether polycarboxylates also include cyclic compounds, particularly alicyclic compounds, such as those described in U.S. Pat. Nos. 3,923,679; 3,835,163; 4,158,635; 4,120,874 and 4,102,903.

Other useful detergency builders include the ether hydroxypolycarboxylates, copolymers of maleic anhydride with ethylene or vinyl methyl ether, 1,3,5-trihydroxy benzene-2,4,6-trisulphonic acid, and carboxymethyloxysuccinic acid, the various alkali metal, ammonium and substituted ammonium salts of polyacetic acids such as ethylenediamine tetraacetic acid and nitrilotriacetic acid, as well as polycarboxylates such as mellitic acid, pyromellitic, succinic acid, oxydisuccinic acid, polymaleic acid, benzene 1,3,5-tricarboxylic acid, carboxymethyloxysuccinic acid, and soluble salts thereof.

Citrate builders, e.g., citric acid and soluble salts thereof (particularly sodium salt), are polycarboxylate builders of particular importance for heavy duty liquid detergent formulations due to their availability from renewable resources and their biodegradability. Citrates can also be used in granular compositions, especially in combination with zeolite and/or layered silicate builders. Oxydisuccinates are also especially useful in such compositions and combinations.

Also suitable in the detergent compositions of the present invention are the 3,3-dicarboxy-4-oxa-1,6-hexanedioates and the related compounds disclosed in U.S. Pat. No. 4,566,984. Useful succinic acid builders include the $C_5-C_{20}$ alkyl and alkenyl succinic acids and salts thereof. A particularly preferred compound of this type is dodecenylsuccinic acid. Specific examples of succinate builders include: laurylsuccinate, myristylsuccinate, palmitylsuccinate, 2-dodecenylsuccinate (preferred), 2-pentadecenylsuccinate, and the like. Laurylsuccinates are the preferred builders of this group, and are described in EP 0,200,263.

Other suitable polycarboxylates are disclosed in U.S. Pat. No. 4,144,226 and in U.S. Pat. No. 3,308,067. See also U.S. Pat. No. 3,723,322.

Fatty acids, e.g., $C_{12}-C_{18}$ monocarboxylic acids such as oleic acid and/or its salts, can also be incorporated into the compositions alone, or in combination with the aforesaid builders, especially citrate and/or the succinate builders, to provide additional builder activity. Such use of fatty acids will generally result in a diminution of sudsing, which should be taken into account by the formulator.

In situations where phosphorus-based builders can be used, and especially in the formulation of bars used for hand-laundering operations, the various alkali metal phosphates such as the well-known sodium tripolyphosphates, sodium pyrophosphate and sodium orthophosphate can be used. Phosphonate builders such as ethane-1-hydroxy-1,1-diphosphonate and other known phosphonates (see, for example, U.S. Pat. Nos. 3,159,581; 3,213,030; 3,422,021; 3,400,148 and 3,422,137) can also be used.

Bleaching Compounds—Bleaching Agents and Bleach Activators

The detergent compositions herein may optionally contain bleaching agents or bleaching compositions containing a bleaching agent and one or more bleach activators. When present, bleaching agents will typically be at levels of from 1% to 30%, more typically from 5% to 20%, of the detergent composition, especially for fabric laundering. If present, the amount of bleach activators will typically be from 0.1% to 60%, more typically from 0.5% to 40% of the bleaching composition comprising the bleaching agent-plus-bleach activator.

The bleaching agents used herein can be any of the bleaching agents useful for detergent compositions in textile cleaning or other cleaning purposes that are now known or become known. These include oxygen bleaches as well as other bleaching agents. Perborate bleaches, e.g., sodium perborate (e.g., mono- or tetra-hydrate) can be used herein.

Another category of bleaching agent that can be used without restriction encompasses percarboxylic acid bleaching agents and salts thereof. Suitable examples of this class of agents include magnesium monoperoxyphthalate hexahydrate, the magnesium salt of metachloro perbenzoic acid, 4-nonylamino-4-oxoperoxybutyric acid and diperoxydodecanedioic acid. Such bleaching agents are disclosed in U.S. Pat. Nos. 4,483,781, 740,446, EP 0,133,354, and U.S. Pat. No. 4,412,934. Highly preferred bleaching agents also include 6-nonylamino-6-oxoperoxycaproic acid as described in U.S. Pat. No. 4,634,551.

Peroxygen bleaching agents can also be used. Suitable peroxygen bleaching compounds include sodium carbonate peroxyhydrate and equivalent "percarbonate" bleaches, sodium pyrophosphate peroxyhydrate, urea peroxyhydrate, and sodium peroxide. Persulfate bleach (e.g., OXONE, manufactured commercially by DuPont) can also be used.

A preferred percarbonate bleach comprises dry particles having an average particle size in the range from 500 micrometers to 1,000 micrometers, not more than 10% by weight of said particles being smaller than 200 micrometers and not more than 10% by weight of said particles being larger than 1,250 micrometers. Optionally, the percarbonate can be coated with silicate, borate or water-soluble surfactants. Percarbonate is available from various commercial sources such as FMC, Solvay and Tokai Denka.

Mixtures of bleaching agents can also be used.

Peroxygen bleaching agents, the perborates, the percarbonates, etc., are preferably combined with bleach activators, which lead to the in situ production in aqueous solution (i.e., during the washing process) of the peroxy acid corresponding to the bleach activator. Various non-limiting examples of activators are disclosed in U.S. Pat. No. 4,915, 854, and U.S. Pat. No. 4,412,934. The nonanoyloxybenzene sulfonate (NOBS), 3,5,5-tri-methyl hexanoyl oxybenzene sulfonate (ISONOBS) and tetraacetyl ethylene diamine (TAED) activators are typical, and mixtures thereof can also be used. See also U.S. Pat. No. 4,634,551 for other typical bleaches and activators useful herein.

Highly preferred amido-derived bleach activators are those of the formulae:

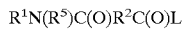

or

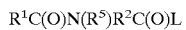

wherein $R^1$ is an alkyl group containing from 6 to 12 carbon atoms, $R^2$ is an alkylene containing from 1 to 6 carbon atoms, $R^5$ is H or alkyl, aryl, or alkaryl containing from 1 to 10 carbon atoms, and L is any suitable leaving group. A leaving group is any group that is displaced from the bleach activator as a consequence of the nucleophilic attack on the bleach activator by the perhydrolysis anion. A preferred leaving group is phenyl sulfonate.

Preferred examples of bleach activators of the above formulae include (6-octanamido-caproyl) oxybenzenesulfonate, (6-nonanamidocaproyl)oxybenzene sulfonate, (6-decanamido-caproyl)oxybenzenesulfonate, and mixtures thereof as described in U.S. Pat. No. 4,634, 551, incorporated herein by reference.

Another class of bleach activators comprises the benzoxazin-type activators disclosed by Hodge et al in U.S. Pat. No. 4,966,723. A highly preferred activator of the benzoxazin-type is:

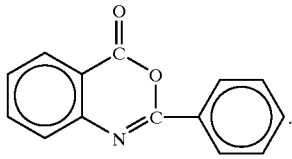

Still another class of preferred bleach activators includes the acyl lactam activators, especially acyl caprolactams and acyl valerolactams of the formulae:

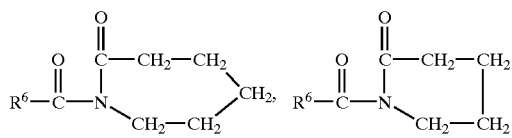

wherein $R^6$ is H or an alkyl, aryl, alkoxyaryl, or alkaryl group containing from 1 to 12 carbon atoms. Highly preferred lactam activators include benzoyl caprolactam, octanoyl caprolactam, 3,5,5-trimethylhexanoyl caprdlactam, nonanoyl caprolactam, decanoyl caprolactam, undecenoyl caprolactam, benzoyl valerolactam, octanoyl valerolactam, decanoyl valerolactam, undecenoyl valerolactam, nonanoyl valerolactam, 3,5,5-trimethylhexanoyl valerolactam and mixtures thereof. See also U.S. Pat. No. 4,545,784, issued to Sanderson, Oct. 8, 1985, incorporated herein by reference, which discloses acyl caprolactams, including benzoyl caprolactam, adsorbed into sodium perborate.

Bleaching agents other than oxygen bleaching agents are also known in the art and can be utilized herein. One type of non-oxygen bleaching agent of particular interest includes photoactivated bleaching agents such as the sulfonated zinc and/or aluminum phthalocyanines. See U.S. Pat. No. 4,033, 718. If used, detergent compositions will typically contain from 0.025% to 1.25%, by weight, of such bleaches, especially sulfonate zinc phthalocyanine.

If desired, the bleaching compounds can be catalyzed by means of a manganese compound. Such compounds are well-known in the art and include, for example, the manganese-based catalysts disclosed in U.S. Pat. Nos. 5,246,621, 5,244,594; 5,194,416; 5,114,606; and EP 549, 271A1, 549,272A1, 544,440A2, and 544,490A1; Preferred examples of these catalysts include $Mn^{IV}_2(u\text{-}O)_3(1,4,7\text{-}trimethyl\text{-}1,4,7\text{-}triazacyclononane)_2(PF_6)_2$, $Mn^{III}_2(u\text{-}O)_1(u\text{-}OAC)_2(1,4,7\text{-}trimethyl\text{-}1,4,7\text{-}triazacyclononane)_2\text{-}(ClO_4)_2$, $Mn^{IV}_4(u\text{-}O)_6(1,4,7\text{-}triazacyclononane)4(ClO_4)_4$, $Mn^{III}Mn^{IV}_4(u\text{-}O)_1(u\text{-}OAc)_2\text{-}(1,4,7\text{-}trimethyl\text{-}1,4,7\text{-}triazacyclononane)_2(ClO_4)_3$, $Mn^{IV}(1,4,7\text{-}trimethyl\text{-}1,4,7\text{-}triazacyclononane)\text{-}(OCH_3)_3(PF_6)$, and mixtures thereof. Other metal-based bleach catalysts include those disclosed in U.S. Pat. No. 4,430,243 and U.S. Pat. No. 5,114,611. The use of manganese with various complex ligands to enhance bleaching is also reported in the following U.S. Pat. Nos.: 4,728,455; 5,284,944; 5,246,612; 5,256,779; 5,280,117; 5,274,147; 5,153,161; and 5,227,084.

As a practical matter, and not by way of limitation, the compositions and processes herein can be adjusted to provide on the order of at least one part per ten million of the active bleach catalyst species in the aqueous washing liquor, and will preferably provide from 0.1 ppm to 700 ppm, more preferably from 1 ppm to 500 ppm, of the catalyst species in the laundry liquor.

Other preferred optional ingredients include enzyme stabilisers, polymeric soil release agents, materials effective for inhibiting the transfer of dyes from one fabric to another during the cleaning process (i.e., dye transfer inhibiting agents), polymeric dispersing agents, suds suppressors, optical brighteners or other brightening or whitening agents, chelating agents, fabric softening clay, anti-static agents, other active ingredients, carriers, hydrotropes, processing aids, dyes or pigments, solvents for liquid formulations and solid fillers for bar compositions.

Liquid detergent compositions can contain water and other solvents as carriers. Low molecular weight primary or secondary alcohols exemplified by methanol, ethanol, propanol, and isopropanol are suitable. Monohydric alcohols are preferred for solubilizing surfactant, but polyols such as those containing from 2 to 6 carbon atoms and from 2 to 6 hydroxy groups (e.g., 1,3-propanediol, ethylene glycol, glycerine, and 1,2-propanediol) can also be used. The compositions may contain from 5% to 90%, typically 10% to 50% of such carriers.

Granular detergents can be prepared, for example, by spray-drying (final product density 520 g/l) or agglomerating (final product density above 600 g/l) the Base Granule.

The remaining dry ingredients can then be admixed in granular or powder form with the Base Granule, for example in a rotary mixing drum, and the liquid ingredients (e.g., nonionic surfactant and perfume) can be sprayed on.

The detergent compositions herein will preferably be formulated such that, during use in aqueous cleaning operations, the wash water will have a pH of between 6.5 and 11, preferably between 7.5 and 10.5. Laundry products are typically at pH 9–11. Techniques for controlling pH at recommended usage levels include the use of buffers, alkalis, acids, etc., and are well-known to those skilled in the art.

Method of Use

Also provided herein is a method for providing a delayed release of an active alcohol which comprises the step of contacting the surface to be treated with a material, preferably an aqueous medium comprising a compound or composition of the invention.

By "surface", it is meant any surface onto which the compound can deposit. Typical examples of such material are fabrics, hard surfaces such as dishware, floors, bathrooms, toilet, kitchen and other surfaces in need of a delayed release of an active alcohol such as that with litter.

By "delayed release" is meant release of the active component (e.g perfume) over a longer period of time than by the use of the active (e.g., perfume) itself.

In the composition examples, the abbreviated component identifications have the following meanings:

Abbreviations used in Examples

In the detergent compositions, the abbreviated component identifications have the following meanings:

| | |
|---|---|
| DEQA | Di-(tallowyl-oxy-ethyl) dimethyl ammonium chloride |
| DTDMAC | Ditallow dimethylammonium chloride |
| Fatty acid | Stearic acid of IV = 0 |
| Electrolyte | Calcium chloride |
| PEG | Polyethylene Glycol 4000 |
| Carezyme | cellulytic enzyme sold by NOVO Industries A/S |
| LAS | Sodium linear $C_{11-13}$ alkyl benzene sulfonate |
| TAS | Sodium tallow alkyl sulfate |
| CxyAS | Sodium $C_{1x}$–$C_{1y}$ alkyl sulfate |
| C46SAS | Sodium $C_{14}$–$C_{16}$ secondary (2,3) alkyl sulfate |
| CxyEzS | Sodium $C_{1x}$–$C_{1y}$ alkyl sulfate condensed with z moles of ethylene oxide |
| CxyEz | $C_{1x}$–$C_{1y}$ predominantly linear primary alcohol condensed with an average of z moles of ethylene oxide |
| QAS | $R_2.N^+(CH_3)_2(C_2H_4OH)$ with $R_2 = C_{12}$–$C_{14}$ |
| QAS 1 | $R_2.N^+(CH_3)_2(C_2H_4OH)$ with $R_2 = C_8$–$C_{11}$ |
| APA | $C_8$–$C_{10}$ amido propyl dimethyl amine |
| Soap | Sodium linear alkyl carboxylate derived from an 80/20 mixture of tallow and coconut fatty acids |
| STS | Sodium toluene sulphonate |
| CFAA | $C_{12}$–$C_{14}$ (coco) alkyl N-methyl glucamide |
| TFAA | $C_{16}$–$C_{18}$ alkyl N-methyl glucamide |
| TPKFA | $C_{12}$–$C_{14}$ topped whole cut fatty acids |
| STPP | Anhydrous sodium tripolyphosphate |
| TSPP | Tetrasodium pyrophosphate |
| Zeolite A | Hydrated sodium aluminosilicate of formula $Na_{12}(AlO_2SiO_2)_{12}.27H_2O$ having a primary particle size in the range from 0.1 to 10 micrometers (weight expressed on an anhydrous basis) |
| NaSKS-6 | Crystalline layered silicate of formula δ-$Na_2Si_2O_5$ |
| Citric acid | Anhydrous citric acid |
| Borate | Sodium borate |

-continued

| | |
|---|---|
| Carbonate | Anydrous sodium carbonate with a particle size between 200 μm and 900 μm |
| Bicarbonate | Anhydrous sodium bicarbonate with a particle size distribution between 400 μm and 1200 μm |
| Silicate | Amorphous sodium silicate ($SiO_2:Na_2O$ = 2.0:1) |
| Sulfate | Anhydrous sodium sulfate |
| Mg sulfate | Anhydrous magnesium sulfate |
| Citrate | Tri-sodium citrate dihydrate of activity 86.4% with a particle size distribution between 425 μm and 850 μm |
| MA/AA | Copolymer of 1:4 maleic/acrylic acid, average molecular weight about 70,000 |
| MA/AA (1) | Copolymer of 4:6 maleic/acrylic acid, average molecular weight about 10,000 |
| AA | Sodium polyacrylate polymer of average molecular weight 4,500 |
| CMC | Sodium carboxymethyl cellulose |
| Cellulose ether | Methyl cellulose ether with a degree of polymerization of 650 available from Shin Etsu-Chemicals |
| Protease | Proteolytic enzyme, having 3.3% by weight of active enzyme, sold by NOVO Industries A/S under the tradename Savinase |
| Protease I | Proteolytic enzyme, having 4% by weight of active enzyme, as described in WO 95/10591, sold by Genencor Int. Inc. |
| Alcalase | Proteolytic enzyme, having 5.3% by weight of active enzyme, sold by NOVO Industries A/S |
| Cellulase | Cellulytic enzyme, having 0.23% by weight of active enzyme, sold by NOVO Industries A/S under the tradename Carezyme |
| Amylase | Amylolytic enzyme, having 1.6% by weight of active enzyme, sold by NOVO Industries A/S under the tradename Termamyl 120T |
| Lipase | Lipolytic enzyme, having 2.0% by weight of active enzyme, sold by NOVO Industries A/S under the tradename Lipolase |
| Lipase (1) | Lipolytic enzyme, having 2.0% by weight of active enzyme, sold by NOVO Industries A/S under the tradename Lipolase Ultra |
| Endolase | Endoglucanase enzyme, having 1.5% by weight of active enzyme, sold by NOVO Industries A/S |
| PB4 | Sodium perborate tetrahydrate of nominal formula $NaBO_2.3H_2O.H_2O_2$ |
| PB1 | Anhydrous sodium perborate bleach of nominal formula $NaBO_2.H_2O_2$ |
| Percarbonate | Sodium percarbonate of nominal formula $2Na_2CO_3.3H_2O_2$ |
| NOBS | Nonanoyloxybenzene sulfonate in the form of the sodium salt |
| NAC-OBS | (6-nonamidocaproyl) oxybenzene sulfonate |
| TAED | Tetraacetylethylenediamine |
| DTPA | Diethylene triamine pentaacetic acid |
| DTPMP | Diethylene triamine penta (methylene phosphonate), marketed by Monsanto under the Tradename Dequest 2060 |
| EDDS | Ethylenediamine-N,N'-disuccinic acid, (S,S) isomer in the form of its sodium salt. |
| Photoactivated (1) | Sulfonated zinc phthlocyanine encapsulated in bleach dextrin soluble polymer |
| Photoactivated bleach (2) | Sulfonated alumino phthlocyanine encapsulated in dextrin soluble polymer |
| Brightener 1 | Disodium 4,4'-bis(2-sulphostyryl)biphenyl |
| Brightener 2 | Disodium 4,4'-bis(4-anilino-6-morpholino-1.3.5-triazin-2-yl)amino) stilbene-2:2'-disulfonate |
| HEDP | 1,1-hydroxyethane diphosphonic acid |
| PEGx | Polyethylene glycol, with a molecular weight of x (typically 4,000) |
| PEO | Polyethylene oxide, with an average molecular weight of 50,000 |
| TEPAE | Tetraethylenepentaamine ethoxylate |
| PVI | Polyvinyl imidazole, with an average molecular weight of 20,000 |
| PVP | Polyvinylpyrolidone polymer, with an average molecular weight of 60,000 |
| PVNO | Polyvinylpyridine N-oxide polymer, with an average molecular weight of 50,000 |

| | |
|---|---|
| PVPVI | Copolymer of polyvinylpyrolidone and vinylimidazole, with an average molecular weight of 20,000 |
| QEA | bis(($C_2H_5O$)($C_2H_4O$)$_n$)($CH_3$)—$N^+$—$C_6H_{12}$—$N^+$—($CH_3$) bis(($C_2H_5O$)—($C_2H_4O$))n, wherein n = from 20 to 30 |
| SRP 1 | Anionically end capped poly esters |
| SRP 2 | Diethoxylated poly (1,2 propylene terephtalate) short block polymer |
| PEI | Polyethyleneimine with an average molecular weight of 1800 and an average ethoxylation degree of 7 ethyleneoxy residues per nitrogen |
| Silicone antifoam | Polydimethylsiloxane foam controller with siloxane-oxyalkylene copolymer as dispersing agent with a ratio of said foam controller to said dispersing agent of 10:1 to 100:1 |
| Opacifier | Water based monostyrene latex mixture, sold by BASF Aktiengesellschaft under the tradename Lytron 621 |
| Wax | Paraffin wax |

The following are synthesis examples of compounds according to the invention:

I-Synthesis of Phenylethyl Methoxyacetate by Transesterification of Methyl Methoxyacetate with Phenylethyl Alcohol Phenylethyl alcohol (31.6 ml, 0.264 mol, 1.1 eq) is mixed with methyl methoxyacetate (25 g, 0.24 mol, 1 eq) and sodium methoxide (1.62 g, 30 mmol, 0.125 eq), in toluene (100 ml). The mixture is heated up under reduced pressure (10 mm Hg) so that most of the toluene and the methanol produced by the transesterification are slowly distilled off over 2 h. After cooling, diethyl ether (100 ml) is added and the mixture is filtered (paper 40), stored at −18° C. for 16 h then filtered again (paper 42) to recover all the catalyst. The clear filtrate is then concentrated on the rotaevaporator, yielding a crude oil which is distilled under 3 mm Hg yielding two fractions of colourless oil:

Fraction 2: 11.5 g (bp 90–110° C. under 3 mm Hg) which is characterised by $^1$H NMR as being 60% in mole phenylethyl methoxyacetate and 40% in mole phenylethyl alcohol.

Fraction 3: 12.95 g (bp 110° C. under 3 mm Hg) which is characterised by $^1$H NMR as being pure phenylethyl methoxyacetate.

II-Synthesis of Rosalva Dimethoxyacetate by Transesterification of Methyl Dimethoxyacetate with Rosalva (9-Decen-1-ol)

Rosalva (32.06 g, 0.206 mol, 1.1 eq) is mixed with methyl dimethoxyacetate (25 g, 0.187 mol, 1 eq) and sodium methoxide (1.26 g, 23.3 mmol, 0.125 eq), in toluene (100 ml). The mixture is heated up under reduced pressure (10 mm Hg) so that most of the toluene and the methanol produced by the transesterification are slowly distilled off over 2 h. After cooling, diethyl ether (100 ml) is added and the mixture is filtered (paper 40), stored at −18° C. for 16 h then filtered again (paper 42) to recover all the catalyst. The clear filtrate is then concentrated on the rotaevaporator, yielding a crude oil which is distilled under 3 mm Hg yielding 26.8 g of colourless oil (bp 130–150° C. under 3 mm Hg) which is characterised by $^1$H NMR as being 90% in mole rosalva dimethoxyacetate and 10% in mole rosalva.

III-Synthesis of Geranyl Dimethoxyacetate by Transesterification of Methyl Dimethoxyacetate with Geraniol Geraniol (31.73 g, 0.206 mol, 1.1 eq) is mixed with methyl dimethoxyacetate (25 g, 0.187 mol, 1 eq) and sodium methoxide (1.26 g, 23.3 mmol, 0.125 eq), in toluene (100 ml). The mixture is heated up under reduced pressure (10 mm Hg) so that most of the toluene and the methanol produced by the transesterification are slowly distilled off over 1 h. After cooling, diethyl ether (100 ml) is added and the mixture is filtered (paper 40), stored at −18° C. for 16 h then filtered again (paper 42) to recover all the catalyst. The clear filtrate is then concentrated on the rotaevaporator, yielding a crude oil which is distilled under 3 mm Hg. Recovered two fractions of colourless oil:

Fraction 2: 6.90 g (bp 120–130° C. under 3 mm Hg) which is characterised by $^1$H NMR as being 90% in mole geranyl dimethoxyacetate and 10% in mole geraniol.

Fraction 3: 34.26 g (bp 130–134° C. under 3 mm Hg) which is characterised by $^1$H NMR as being pure geranyl dimethoxyacetate.

IV-Synthesis of Phenylethyl Dimethoxyacetate by Transesterification of Methyl Dimethoxyacetate with Phenylethyl Alcohol Phenylethyl alcohol (25.1 g, 0.206 mol, 1.1 eq) is mixed with methyl dimethoxyacetate (25 g, 0.187 mol, 1 eq) and sodium methoxide (1.26 g, 23.3 mmol, 0.125 eq), in toluene (100 ml). The mixture is heated up under reduced pressure (10 mm Hg) so that most of the toluene and the methanol produced by the transesterification are slowly distilled off over 1 h. After cooling, diethyl ether (100 ml) is added and the mixture is filtered (paper 40), stored at −18° C. for 16 h then filtered again (paper 42) to recover all the catalyst. The clear filtrate is then concentrated on the rotaevaporator, yielding a crude oil which is distilled under 3 mm Hg yielding 28.31 g of colourless oil (bp 155–160° C. under 3 mm Hg) which is characterised by $^1$H NMR as being 90% in mole phenylethyl dimethoxyacetate and 10% in mole phenylethyl alcohol.

V-Synthesis of Undecavertyl Dimethoxyacetate by Transesterification of Methyl Dimethoxyacetate with Undecavertol Undecavertol (35 g, 0.206 mol, 1.1 eq) is mixed with methyl dimethoxyacetate (25 g, 0.187 mol, 1 eq) and sodium methoxide (1.26 g, 23.3 mmol, 0.125 eq), in toluene (100 ml). The mixture is heated up under reduced pressure (10 mm Hg) so that most of the toluene and the methanol produced by the transesterification are slowly distilled off over 3 h. After cooling, diethyl ether (100 ml) is added and the mixture is filtered (paper 40), stored at −18° C. for 16 h then filtered again (paper 42) to recover all the catalyst. The clear filtrate is then concentrated on the rotaevaporator, yielding a crude oil which is distilled under 3 mm Hg yielding 25.6 g of colouriess oil (bp 122–134° C. under 3 mm Hg) which is characterised by $^1$H NMR as being pure undecavertyl dimethoxyacetate.

VI-Synthesis of Dihydromyrcenyl Dimethoxyacetate by Transesterification of Methyl Dimethoxyacetate with Dihydromyrcenol Dihydromyrcenol (32.2 g, 0.206 mol, 1.1 eq) is mixed with methyl dimethoxyacetate (25 g, 0.187 mol, 1 eq) and sodium methoxide (1.26 g, 23.3 mmol, 0.125 eq), in toluene (100 ml). The mixture is heated up under reduced pressure (10 mm Hg) so that most of the toluene and the methanol produced by the transesterification are slowly distilled off over 2 h. After cooling, diethyl ether (100 ml) is added and the mixture is filtered (paper 40), stored at −18° C. for 16 h then filtered again (paper 42) to recover all the catalyst. The clear filtrate is then concentrated on the rotaevaporator, yielding a crude oil which is analysed by $^1$H NMR showing that 70% in mole of the starting methyl dimethoxyacetate has been converted into dihydromyrcenyl dimethoxyacetate. The crude oil is fractionated under 3 mm Hg yielding 20.97 g of colouriess oil (bp 107° C. under 3 mm Hg) which is characterised by $^1$H NMR as being pure dihydromyrcenyl dimethoxyacetate.

VII-Synthesis of Linalyl Dimethoxyacetate by Transesterification of Methyl Dimethoxyacetate with Linalool Linalool (31.78 g, 0.206 mol, 1.1 eq) is mixed with methyl dimethoxyacetate (25 g, 0.187 mol, 1 eq) and sodium methoxide (1.26 g, 23.3 mmol, 0.125 eq), in toluene (100 ml). The mixture is heated up under reduced pressure (10 mm Hg) so that most of the toluene and the methanol produced by the transesterification are slowly distilled off over 2 h. After cooling, diethyl ether (100 ml) is added and the mixture is filtered (paper 40), stored at −18° C. for 16 h then filtered again (paper 42) to recover all the catalyst. The clear filtrate is then concentrated on the rotaevaporator, yielding a crude oil which is fractionated under 3 mm Hg yielding 9.8 g of colourless oil (bp 106° C. under 3 mm Hg) which is characterised by $^1$H NMR as being pure linalyl dimethoxyacetate.

VIII-Synthesis of Phenylethyl Diethoxyacetate by Transesterification of Ethyl Diethoxyacetate with Phenylethyl Alcohol Phenylethyl alcohol (25.1 g, 0.206 mol, 1.1 eq) is mixed with ethyl diethoxyacetate (32.95 g, 0.187 mol, 1 eq) and sodium methoxide (1.26 g, 23.3 mmol, 0.125 eq), in toluene (100 ml). The mixture is heated up under reduced pressure (10 mm Hg) so that most of the toluene and the methanol produced by the transesterification are slowly distilled off over 2 h. After cooling, diethyl ether (100 ml) is added and the mixture is filtered (paper 40), stored at −18° C. for 16 h then filtered again (paper 42) to recover all the catalyst. The clear filtrate is then concentrated on the rotaevaporator, yielding a crude oil which is fractionated under 3 mm Hg yielding 27.60 9 of colourless oil (bp 126–130° C. under 3 mm Hg) which is characterised by $^1$H NMR as being pure phenylethyl diethoxyacetate.

IX-Synthesis of a Mixture of Phenylethyl 2-Hydroxy-2-methoxyacetate and Phenylethyl 2-Hydroxy-2-phenylethoxyacetate by Transesterification and Transacetalization of Methyl 2-Hydroxy-2-methoxyacetate with Phenylethyl Alcohol Phenylethyl alcohol (22.83 g, 0.1 mol, 1 eq) is mixed with methyl 2-hydroxy-2-methoxyacetate (22.46 g, 0.187 mol, 1 eq) and sodium methoxide (0.38 g, 7 mmol, 0.0375 eq), in toluene (125 ml). The mixture is heated under reduced pressure (10 mm Hg) so that most of the toluene and the methanol produced by the transesterification and the transacetalization are slowly distilled off over 2 h. After cooling, diethyl ether (100 ml) is added and the mixture is filtered (paper 42) to recover all the catalyst. The clear filtrate is then concentrated on the rotaevaporator, yielding a crude oil which is characterised by $^1$H NMR as being 45% in mole methyl 2-hydroxy-2-phenylethoxyacetate, 35% in mole phenylethyl 2-hydroxy-2-phenylethoxyacetate and 20% in mole phenylethyl alcohol.

X-Synthesis of Methyl 2-Hydroxy-2-geranyloxyacetate by Transacetalization of Methyl 2-Hydroxy-2-methoxyacetate with Geraniol Geraniol (35 ml, 0.2 mol, 1 eq) is mixed with methyl 2-hydroxy-2-methoxyacetate (24 g, 0.2 mol, 1 eq) and sodium methoxide (0.38 g, 7 mmol, 0.0375 eq), in toluene (150 ml). The mixture is heated up under reduced pressure (10 mm Hg) so that most of the toluene and the methanol produced by the transacetalization are slowly distilled off over 3 h. After cooling, diethyl ether (200 ml) is added and the mixture is filtered (paper 42) to recover the catalyst. The clear filtrate is then concentrated on the rotaevaporator, yielding an oil which is characterised by $^1$H NMR as being 85% in mole methyl 2-hydroxy-2-geranyloxyacetate and 15% in mole geraniol.

XI-Synthesis of Geranyl 2-Hydroxy-2-geranyloxyacetate by Transesterification and Transacetalization of Methyl 2-Hydroxy-2-methoxyacetate with Geraniol Geraniol (35 ml, 0.2 mol, 2 eq) is mixed with methyl 2-hydroxy-2-methoxyacetate (12 g, 0.1 mol, 1 eq) and sodium methoxide (0.75 9, 14 mmol, 0.14 eq), in toluene (125 ml). The mixture is heated up under reduced pressure (10 mm Hg) so that most of the toluene and the methanol produced by the transesterification and the transacetalization are slowly distilled off over 2 h. After cooling, diethyl ether (200 ml) is added and the mixture is filtered twice (paper 42) to recover all the catalyst. The clear filtrate is then concentrated on the rotaevaporator, yielding a crude brown oil (35 g) which is characterised by $^1$H NMR as being 75% in mole methyl 2-hydroxy-2-geranyloxyacetate and 25% in mole geraniol.

XII-Synthesis of Methyl 2-Hydroxy-2-Rosalvaoxyacetate by Transacetalization of Methyl 2-Hydroxy-2-methoxyacetate with Rosalva (9-Decen-1-ol) Without any Catalyst Rosalva (37.0 ml, 0.18 mol, 1 eq) is mixed with methyl 2-hydroxy-2-methoxyacetate (24 g, 0.2 mol, 1 eq) in toluene (100 ml). The mixture is stirred at room temperature under reduced pressure (10 mm Hg) for an hour before gentle heat is so that most of the toluene and the methanol produced by the transacetalization are slowly distilled off over 2 h. After complete evaporation of any residual toluene concentrated on the rotaevaporator, the clear oil obtained is characterised by $^1$H and $^{13}$C NMR as being 80% in mole methyl 2-hydroxy-2-rosalvaoxyacetate and 20% in mole rosalva, no starting methyl 2-hydroxy-2-methoxyacetate being left.

XIII-Synthesis of Methyl 2-Hydroxy-2-rosalvaoxyacetate by Transacetalization of Methyl 2-Hydroxy-2-methoxyacetate with Rosalva (9-Decen-1-ol) with an Acidic Catalyst Rosalva (37.0 ml, 0.18 mol, 1 eq) is mixed with methyl 2-hydroxy-2-methoxyacetate (24 g, 0.2 mol, 1 eq) in toluene (100 ml) and 6 drops of 1N hydrochloric acid. The mixture is stirred at room temperature under reduced pressure (10 mm Hg) for an hour before gentle heat is so that most of the toluene and the methanol produced by the transacetalization are slowly distilled off over 2 h. After complete evaporation of any residual toluene concentrated on the rotaevaporator, the clear oil obtained is characterised by $^1$H and $^{13}$C NMR as being 85% in mole methyl 2-hydroxy-2-rosalvaoxyacetate and 15% in mole rosalva, no starting methyl 2-hydroxy-2-methoxyacetate being left.

XIV-Synthesis of Methyl 2-Hydroxy-2-rosalvaoxyacetate by Transacetalization of Methyl 2-Hydroxy-2-methoxyacetate with Rosalva (9-Decen-1-ol), using Sodium Methoxide as Catalyst Rosalva (33.3 ml, 0.18 mol, 0.9 eq) is mixed with methyl 2-hydroxy-2-methoxyacetate (24 g, 0.2 mol, 1 eq) and sodium methoxide (0.38 g, 7 mmol, 0.0375 eq), in toluene (150 ml). The mixture is heated up under reduced pressure (10 mm Hg) so that most of the toluene and the methanol produced by the transacetalization are slowly distilled off over 2 h. After cooling, diethyl ether (200 ml) is added and the mixture is filtered (paper 42) to recover the catalyst. The clear filtrate is then concentrated on the rotaevaporator, yielding an oil which is characterised by $^1$H NMR as being 95% in mole methyl 2-hydroxy-2-rosalvaoxyacetate and 5% in mole rosalva.

XV-Synthesis of Methyl 2-Hydroxy-2-undecavertyloxyacetate by Transacetalization of Methyl 2-Hydroxy-2-methoxyacetate with Undecavertol Undecavertol (42.5 ml, 0.25 mol, 1 eq) is mixed with methyl 2-hydroxy-2-methoxyacetate (30.03 g, 0.25 mol, 1 eq) and sodium methoxide (0.5 g, 9.4 mmol, 0.0375 eq), in toluene (150 ml). The mixture is heated up under reduced pressure (10 mm Hg) so that most of the toluene and the methanol produced by the transacetalization are slowly distilled off over 2 h. After cooling, diethyl ether (200 ml) is added and the mixture is filtered (paper 42) to recover the catalyst. The clear filtrate is then concentrated on the rotaevaporator, yielding an oil which is characterised by $^1$H NMR as being 50% in mole methyl 2-hydroxy-2-undecavertyloxyacetate and 50% in mole undecavertol.

XVI-Synthesis of Methyl 2-Hydroxy-2-undecavertyloxyacetate from Methyl Glyoxylate (Generated from Methyl 2-Hydroxy-2-methoxyacetate and Phosphorus Pentoxide) and Undecavertol (4-Methyl-3-decen-5-ol)

Methyl 2-hydroxy-2-methoxyacetate (120 g, 1 mol, 1 eq) is placed in a 250 ml three necks round-bottom flask, fitted with a Vigreux column, a thermometer and a funnel, all glassware having been washed with diluted acid and dried previously. To this is slowly added, in three portions, with stirring, phosphorus pentoxide (71 g, 0.5 mol, 0.5 eq), being careful not to allow the temperature to rise above 90° C. At the end of addition, the mixture is allowed to stir for an hour before heat is applied and the methyl glyoxylate distilled under a nitrogen blanket. 67 g of methyl glyoxylate (bp 106–107° C.) is recovered upon distillation. Some of this freshly distilled methyl glyoxylate (12 g, 0.136 mol, 1 eq) is mixed with undecavertol (25.5 g, 0.15 mol, 1.1 eq) and the mixture is left to stand for 16 h. The reaction is initially strongly exothermic. After 16 h standing, the crude oil is characterised by $^1$H NMR as being 90% in mole methyl 2-hydroxy-2-undecavertyloxyacetate and 10% in mole undecavertol, with only traces of methyl glyoxylate left.

XVII-Synthesis of a Mixture of Methyl 2-Hydroxy-2-activeoxyacetates from Methyl Glyoxylate and a Blend of Four Perfume Alcohols The composition of the blend of four perfume alcohols is: Majantol (2,2-dimethyl-3-(3-methylphenyl)-1-propanol): 62.5% wt Rosalva (9-decen-lol): 15% wt L-isopulegol (L-1methyl-4-isopropenylcyclohexan-3-ol): 15% wt undecavertol (4-methyl-3-decen-5-ol): 7.5% wt Some freshly distilled methyl glyoxylate (12 g, 0.136 mol, 1 eq) is mixed with the described blend of four perfume alcohols (25.5 g, 0.15 mol, 1.1 eq) and the mixture is left to stand for 16 h. The reaction is initially strongly exothermic. After 16 h standing, the crude oil is characterised by $^1$H NMR as containing only traces of starting methyl glyoxylate. Methyl 2-hydroxy-2-activeoxyacetate of each perfume alcohol could be clearly detected in the reaction mixture.

XVIII-Poly(methyl Lyoxylate) of Geraniol

1)-Synthesis of Poly(methyl Glyoxylate)

To a solution of freshly distilled methyl glyoxylate (10.2 g, 0.116 mol) in dichloromethane (5 ml) is added a freshly made solution of dimethyl sodiomethylmalonate in THF (0.5 ml of a 0.05 mol/l solution). The mixture is stirred at 15° C. for an hour then trifluoroacetic acid (0.18 ml, 2.3 mmol) is added, followed by ethyl vinyl ether (3.5 ml, 36.6 mmol). The mixture is stirred at 15° C. for 18 hours then sodium carbonate (0.5 g, 4.6 mmol, 2 eq compared to trifluoroacetic acid) is added. The mixture is stirred for 30 minutes before being diluted with 30 ml of dichloromethane and washed with water (25 ml). The aqueous phase is then extracted with dichloromethane (20 ml). Both organic phases are combined and dried over sodium sulfate. After filtration and concentration on the rotaevaporator, a colourless gum (11.2 g) is obtained.

2a)-Transesterification of Poly(methyl Glyoxylate) with Geraniol

The poly(methyl glyoxylate) obtained in the previous example (11.2 g, 0.128 mol of repeat unit) is dissolved in toluene (150 ml). Then, geraniol (21.9 ml, 0.125 mol) is added, followed by sodium methoxide (0.75 g, 18.75 mmol, 0.15 eq). The mixture is heated up under reduced pressure (10 mm Hg) so that most of the toluene and the methanol produced by the transesterification are slowly distilled off over 3 h. After complete removal of the toluene on the rotaevaporator, a dark brown oil (24.15 g) is obtained.

2b)-Second other Experiment of Transesterification of Poly(methyl Glyoxylate) with Geraniol Some poly(methyl glyoxylate) obtained as in the example XVIII 1) above (11.2 g, 0.128 mol of repeat unit) is dissolved in toluene (150 ml). Then, geraniol (16 ml, 0.095 mol, ~0.7 eq) is added, followed by sodium methoxide (0.375 g, 9.4 mmol, 0.075 eq vs. repeat unit). The mixture is heated up under reduced pressure (10 mm Hg) so that most of the toluene and the methanol produced by the transesterification are slowly distilled off over 2 h. After cooling, diethyl ether (100 ml) is added and the mixture is filtered (paper 42). The light brown clear filtrate is then concentrated on the rotaevaporator, yielding a light brown oil (20.6 g).

XIX-Synthesis of a Copolymer of Methyl Glyoxylate and Dodecanal

To a solution of freshly distilled methyl glyoxylate (10.2 g, 0.116 mol), dodecanal (10.67 g, 0.058 mol) in dichloromethane (10 ml) is added a freshly made solution of dimethyl sodiomethylmalonate in THF (0.5 ml of a 0.05 molll solution). The mixture is stirred at 20° C. for an hour then trifluoroacetic acid (0.18 ml, 2.3 mmol) is added, followed by ethyl vinyl ether (3.5 ml, 36.6 mmol). The mixture is stirred at 20° C. for 18 hours then sodium carbonate (0.5 g, 4.6 mmol, 2 eq compared to trifluoroacetic acid) is added. The mixture is stirred for 30 minutes before being diluted with 30 ml of dichloromethane and washed with water (25 ml). The aqueous phase is then extracted with dichloromethane (20 ml). Both organic phases are combined and dried over sodium sulfate. After filtration and concentration on the rotaevaporator, a colourless gum (15.5 g) is obtained.

XX-Synthesis of a Copolymer of Geranyl Glyoxylate and Dodecanal by Transesterification of the Copolymer of Methyl Glyoxylate and Dodecanal with Geraniol The copolymer of methyl glyoxylate and dodecanal obtained as in the example XIX above (15.5 g, 0.116 mol of methyl glyoxylate repeat units) is dissolved in toluene (100 ml). Then, geraniol (18.1 ml, 0.104 mol, ~0.9 eq compared to methyl glyoxylate repeat units) is added, followed by sodium methoxide (1.40 g, 0.026 mmol, 0.25 eq vs. geraniol). The mixture is heated up under reduced pressure (10 mm Hg) so that most of the toluene and the methanol produced by the transesterification are slowly distilled off over 2 h. After cooling, diethyl ether (100 ml) is added and the mixture is filtered (paper 42). The brown filtrate is then concentrated on the rotaevaporator, yielding a brown oil.

XXI-Syinthesis of a Copolymer of Methyl Glyoxylate and Trans-4-decenal

To a solution of freshly distilled methyl glyoxylate (30 g, 0.349 mol), trans-4-decenal (2.63 g, 0.017 mol) in dichloromethane (30 ml) is added boron trifluoride diethyl etherate (1 ml). The mixture is stirred at 0° C. for one and a half hour before trifluoroacetic acid (1.08 ml, 14 mmol) is added, followed by a dropwise addition at 0° C. of ethyl vinyl ether (10.5 ml). The mixture is stirred at 20° C. for 18 hours then sodium carbonate (1.5 g, 14 mmol) is added. The mixture is stirred for 30 minutes before being diluted with 30 ml of dichloromethane and washed with water (40 ml). The aqueous phase is then extracted with dichloromethane (30 ml). Both organic phases are combined and dried over sodium sulfate. After filtration and concentration on the rotaevaporator, a dark brown gum (30 g) is obtained.

XXII-Synthesis of a Copolymer of Geranyl Glyoxylate and Trans-4-decenal by Transesterification of the Copolymer of Methyl Glyoxylate and Trans-4-Decenal with Geraniol The copolymer of methyl glyoxylate and trans-4-decenal obtained as in the example XXI above (30 g, 0.349 mol of methyl glyoxylate repeat units) is dissolved in toluene (100 ml). Then, geraniol (36.3 ml, 0.21 mol, ~0.6 eq compared to methyl glyoxylate repeat units) is added, followed by sodium methoxide (1.13 g, 0.021 mmol, 0.1 eq vs. geraniol). The mixture is heated up under reduced pressure (10 mm Hg) so that most of the toluene and the methanol produced by the transesterification are slowly distilled off over 2 h. After cooling, diethyl ether (100 ml) is added and the mixture is filtered (paper 42). The dark brown filtrate is then concentrated on the rotaevaporator, yielding a dark brown oil (51 g).

XXIII-Synthesis of a Terpolymer of Methyl Glyoxylate, Trans-4-decenal and Benzaldehyde To a solution at 0° C. of freshly distilled methyl glyoxylate (30 g, 0.349 mol), trans-4-decenal (2.63 g, 0.017 mol) and benzaldehyde (0.19 g, 1.75 mmol) in dichloromethane (30 ml) is added boron trifluoride diethyl etherate (1 ml). The mixture is stirred at 0° C. for one and a half hour before trifluoroacetic acid (1.08 ml, 14 mmol) is added, followed by a dropwise addition at 0° C. of ethyl vinyl ether (10.5 ml). The mixture is stirred at 0° C. for 30 minutes and then at 20° C. for 18 hours before sodium carbonate (3 g, 28 mmol) is added. The mixture is stirred for 30 minutes before being diluted with 30 ml of dichloromethane and washed with water (30 ml). The aqueous phase is then extracted with dichloromethane (30 ml). Both organic phases are combined and dried over sodium sulfate. After filtration and concentration on the rotaevaporator, a brown gum (27 g) is obtained.

XXIV-Synthesis of a Terpolymer of Geranyl Glyoxylate, Trans-4-decenal and Benzaldehyde by Transesterification of the Terpolymer of Methyl Glyoxylate, Trans-4-decenal and Benzaldehyde of Example XXIII with Geraniol The terpolymer of methyl glyoxylate, trans-4-decenal and benzaldehyde obtained as in the example XXIII above (25 g, ~0.28 mol of methyl glyoxylate repeat units) is dissolved in toluene (100 ml). Then, geraniol (29.6 ml, 0.17 mol, ~0.6 eq compared to methyl glyoxylate repeat units) is added, followed by sodium methoxide (0.92 g, 0.017 mmol, 0.1 eq vs. geraniol). The mixture is heated up under reduced pressure so that most of the toluene and the methanol produced by the transesterification are slowly distilled off at 65° C., over 2 h. After cooling, diethyl ether (100 ml) is added and the mixture is filtered (paper 42). The dark brown filtrate is then concentrated on the rotaevaporator, yielding a dark brown oil (47 g).

In the following formulation examples all levels are quoted as % by weight of the composition unless otherwise stated:

EXAMPLE 1

The following high density granular laundry detergent compositions A to F were prepared in accord with the invention:

| | A | B | C | D | E | F |
|---|---|---|---|---|---|---|
| LAS | 8.0 | 8.0 | 8.0 | 2.0 | 6.0 | 6.0 |
| TAS | — | 0.5 | — | 0.5 | 1.0 | 0.1 |
| C46(S)AS | 2.0 | 2.5 | — | — | — | — |
| C25AS | — | — | — | 7.0 | 4.5 | 5.5 |
| C68AS | 2.0 | 5.0 | 7.0 | — | — | — |
| C25E5 | — | — | 3.4 | 10.0 | 4.6 | 4.6 |
| C25E7 | 3.4 | 3.4 | 1.0 | — | — | — |
| C25E3S | — | — | — | 2.0 | 5.0 | 4.5 |
| QAS | — | 0.8 | — | — | — | — |
| QAS (I) | — | — | — | 0.8 | 0.5 | 1.0 |
| Zeolite A | 18.1 | 18.0 | 14.1 | 18.1 | 20.0 | 18.1 |
| Citric acid | — | — | — | 2.5 | — | 2.5 |
| Carbonate | 13.0 | 13.0 | 27.0 | 10.0 | 10.0 | 13.0 |
| SKS-6 | — | — | — | 10.0 | — | 10.0 |
| Silicate | 1.4 | 1.4 | 3.0 | 0.3 | 0.5 | 0.3 |
| Citrate | — | 1.0 | — | 3.0 | — | — |
| Sulfate | 26.1 | 26.1 | 26.1 | 6.0 | — | — |
| Mg sulfate | 0.3 | — | — | 0.2 | — | 0.2 |
| MA/AA | 0.3 | 0.3 | 0.3 | 4.0 | 1.0 | 1.0 |
| CMC | 0.2 | 0.2 | 0.2 | 0.2 | 0.4 | 0.4 |
| PB4 | 9.0 | 9.0 | 5.0 | — | — | — |
| Percarbonate | — | — | — | — | 18.0 | 18.0 |
| TAED | 1.5 | 0.4 | 1.5 | — | 3.9 | 4.2 |
| NAC-OBS | — | 2.0 | 1.0 | — | — | — |
| DTPMP | 0.25 | 0.25 | 0.25 | 0.25 | — | — |
| SRP I | — | — | — | 0.2 | — | 0.2 |
| EDDS | — | 0.25 | 0.4 | — | 0.5 | 0.5 |
| CFAA | — | 1.0 | — | 2.0 | — | — |
| HEDP | 0.3 | 0.3 | 0.3 | 0.3 | 0.4 | 0.4 |
| QEA | — | — | — | 0.2 | — | 0.5 |
| Protease I | — | — | 0.26 | 1.0 | — | — |
| Protease | 0.26 | 0.26 | — | — | 1.5 | 1.0 |
| Cellulase | 0.3 | — | — | 0.3 | 0.3 | 0.3 |
| Amylase | 0.1 | 0.1 | 0.1 | 0.4 | 0.5 | 0.5 |
| Lipase (1) | 0.3 | — | — | — | 0.5 | 0.5 |
| Photoactivated bleach (ppm) | 15 ppm | 15 ppm | 15 ppm | — | 20 ppm | 20 ppm |
| PVNO/PVPVI | — | — | — | 0.1 | — | — |
| Brightener 1 | 0.09 | 0.09 | 0.09 | — | 0.09 | 0.09 |
| Perfume | 0.3 | 0.3 | 0.3 | 0.4 | 0.4 | 0.4 |
| Glyoxylic (*) | 0.3 | 0.3 | 0.3 | 0.4 | 0.4 | 0.4 |
| Silicone antifoam | 0.5 | 0.5 | 0.5 | — | 0.3 | 0.3 |
| Misc/minors to 100% | | | | | | |
| Density in g/liter | 850 | 850 | 850 | 850 | 850 | 850 |

(*) Glyoxylic compound as made in any one of Synthesis Examples I to XXIV.

EXAMPLE 2

The following granular laundry detergent compositions G to L of particular utility under European machine wash conditions were prepared in accord with the invention:

|  | G | H | I | J | K | L |
|---|---|---|---|---|---|---|
| LAS | 5.5 | 7.5 | 5.0 | 5.0 | 6.0 | 7.0 |
| TAS | 1.25 | 1.86 | — | 0.8 | 0.4 | 0.3 |
| C24AS/C25AS | — | 2.24 | 5.0 | 5.0 | 5.0 | 2.2 |
| C25E3S | — | 0.76 | 1.0 | 1.5 | 3.0 | 1.0 |
| C45E7 | 3.25 | — | — | — | — | 3.0 |
| TFM | — | — | 2.0 | — | — | — |
| C25E5 | — | 5.5 | — | — | — | — |
| QAS | 0.8 | — | — | — | — | — |
| QAS II | — | 0.7 | 1.0 | 0.5 | 1.0 | 0.7 |
| STPP | 19.7 | — | — | — | — | — |
| Zeolite A | — | 19.5 | 25.0 | 19.5 | 20.0 | 17.0 |
| NaSKS-6/citric acid (79:21) | — | 10.6 | — | 10.6 | — | — |
| NaSKS-6 | — | — | 9.0 | — | 10.0 | 10.0 |
| Carbonate | 6.1 | 21.4 | 9.0 | 10.0 | 10.0 | 18.0 |
| Bicarbonate | — | 2.0 | 7.0 | 5.0 | — | 2.0 |
| Silicate | 6.8 | — | — | 0.3 | 0.5 | — |
| Citrate | — | — | 4.0 | 4.0 | — | — |
| Sulfate | 39.8 | — | — | 5.0 | — | 12.0 |
| Mg sulfate | — | — | 0.1 | 0.2 | 0.2 | — |
| MA/AA | 0.5 | 1.6 | 3.0 | 4.0 | 1.0 | 1.0 |
| CMC | 0.2 | 0.4 | 1.0 | 1.0 | 0.4 | 0.4 |
| PB4 | 5.0 | 12.7 | — | — | — | — |
| Percarbonate | — | — | — | — | 18.0 | 15.0 |
| TAED | 0.5 | 3.1 | — | — | 5.0 | — |
| NAC-OBS | 1.0 | 3.5 | — | — | — | 2.5 |
| DTPMP | 0.25 | 0.2 | 0.3 | 0.4 | — | 0.2 |
| HEDP | — | 0.3 | — | 0.3 | 0.3 | 0.3 |
| QEA | — | — | 1.0 | 1.0 | 1.0 | — |
| Protease I | — | — | — | 0.5 | 1.2 | — |
| Protease | 0.26 | 0.85 | 0.9 | 1.0 | — | 0.7 |
| Lipase (1) | 0.15 | 0.15 | 0.3 | 0.3 | 0.3 | 0.2 |
| Cellulase | 0.28 | 0.28 | 0.2 | 0.2 | 0.3 | 0.3 |
| Amylase | 0.1 | 0.1 | 0.4 | 0.4 | 0.6 | 0.2 |
| PVNO/PVPVI | — | — | 0.2 | 0.2 | — | — |
| PVP | 0.9 | 1.3 | — | — | — | 0.9 |
| SRP 1 | — | — | 0.2 | 0.2 | 0.2 | — |
| Photoactivated bleach (1) (ppm) | 15 ppm | 27 ppm | — | — | 20 ppm | 20 ppm |
| Photoactivated bleach (2) (ppm) | 15 ppm | — | — | — | — | — |
| Brightener 1 | 0.08 | 0.19 | — | — | 0.09 | 0.15 |
| Brightener 2 | — | 0.04 | — | — | — | — |
| Perfume | 0.3 | 0.3 | 0.4 | 0.3 | 0.4 | 0.3 |
| Glyoxylic (*) | 0.3 | 0.3 | 0.4 | 0.3 | 0.4 | 0.3 |
| Silicone antifoam | 0.5 | 2.4 | 0.3 | 0.5 | 0.3 | 2.0 |
|  | Minors/misc to 100% | | | | | |
| Density in g/liter | 750 | 750 | 750 | 750 | 750 | 750 |

(*) Glyoxylic compound as made in any one of Synthesis Examples I to XXIV.

EXAMPLE 3

The following detergent formulations of particular utility under European machine wash conditions were prepared in accord with the invention.

|  | M | N | O | P |
|---|---|---|---|---|
| Blown powder | | | | |
| LAS | 6.0 | 5.0 | 11.0 | 6.0 |
| TAS | 2.0 | — | — | 2.0 |
| Zeolite A | 24.0 | — | — | 20.0 |
| STPP | — | 27.0 | 24.0 | — |
| Sulfate | 4.0 | 6.0 | 13.0 | — |
| MA/AA | 1.0 | 4.0 | 6.0 | 2.0 |
| Silicate | 1.0 | 7.0 | 3.0 | 3.0 |
| CMC | 1.0 | 1.0 | 0.5 | 0.6 |
| Brightener 1 | 0.2 | 0.2 | 0.2 | 0.2 |
| Silicone antifoam | 1.0 | 1.0 | 1.0 | 0.3 |
| DTPMP | 0.4 | 0.4 | 0.2 | 0.4 |
| Spray on | | | | |
| Brightener | 0.02 | — | — | 0.02 |
| C45E7 | — | — | — | 5.0 |
| C45E2 | 2.5 | 2.5 | 2.0 | — |
| C45E3 | 2.6 | 2.5 | 2.0 | — |
| Perfume | 0.5 | 0.3 | 0.5 | 0.2 |
| Glyoxylic (*) | 0.5 | 0.3 | 0.5 | 0.2 |
| Silicone antifoam | 0.3 | 0.3 | 0.3 | — |
| Dry additives | | | | |
| QEA | — | — | — | 1.0 |
| EDDS | 0.3 | — | — | — |
| Sulfate | 2.0 | 3.0 | 5.0 | 10.0 |
| Carbonate | 6.0 | 13.0 | 15.0 | 14.0 |
| Citric acid | 2.5 | — | — | 2.0 |
| QAS II | 0.5 | — | — | 0.5 |
| SKS-6 | 10.0 | — | — | — |
| Percarbonate | 18.5 | — | — | — |
| PB4 | — | 18.0 | 10.0 | 21.5 |
| TAED | 2.0 | 2.0 | — | 2.0 |
| NAC-OBS | 3.0 | 2.0 | 4.0 | — |
| Protease | 1.0 | 1.0 | 1.0 | 1.0 |
| Lipase | — | 0.4 | — | 0.2 |
| Lipase (1) | 0.4 | — | 0.4 | — |
| Amylase | 0.2 | 0.2 | 0.2 | 0.4 |
| Brightener 1 | 0.05 | — | — | 0.05 |
|  | Misc/minor to 100% | | | |

(*) Glyoxylic compound as made in any one of Synthesis Examples I to XXIV.

EXAMPLE 4

The following granular detergent formulations were prepared in accord with the invention.

|  | Q | R | S | T | U | V |
|---|---|---|---|---|---|---|
| Blown powder | | | | | | |
| LAS | 23.0 | 8.0 | 7.0 | 9.0 | 7.0 | 7.0 |
| TAS | — | — | — | — | 1.0 | — |
| C45AS | 6.0 | 6.0 | 5.0 | 8.0 | — | — |
| C45AES | — | 1.0 | 1.0 | 1.0 | — | — |
| C45E35 | — | — | — | — | 2.0 | 4.0 |
| Zeolite A | 10.0 | 18.0 | 14.0 | 12.0 | 10.0 | 10.0 |
| MA/AA | — | 0.5 | — | — | — | 2.0 |
| MA/AA (1) | 7.0 | — | — | — | — | — |
| AA | — | 3.0 | 3.0 | 2.0 | 3.0 | 3.0 |
| Sulfate | 5.0 | 6.3 | 14.3 | 11.0 | 15.0 | 19.3 |
| Silicate | 10.0 | 1.0 | 1.0 | 1.0 | 1.0 | 1.0 |
| Carbonate | 15.0 | 20.0 | 10.0 | 20.7 | 8.0 | 6.0 |
| PEG 4000 | 0.4 | 1.5 | 1.5 | 1.0 | 1.0 | 1.0 |
| DTPA | — | 0.9 | 0.5 | — | — | 0.5 |
| Brightener 2 | 0.3 | 0.2 | 0.3 | — | 0.1 | 0.3 |
| Spray on | | | | | | |
| C45E7 | — | 2.0 | — | — | 2.0 | 2.0 |
| C25E9 | 3.0 | — | — | — | — | — |

-continued

|  | Q | R | S | T | U | V |
|---|---|---|---|---|---|---|
| C23E9 | — | — | 1.5 | 2.0 | — | 2.0 |
| Perfume | 0.3 | 0.3 | 0.3 | 2.0 | 0.3 | 0.3 |
| Glyoxylic (*) | 0.3 | 0.3 | 0.3 | 2.0 | 0.3 | 0.3 |
| Agglomerates |  |  |  |  |  |  |
| C45AS | — | 5.0 | 5.0 | 2.0 | — | 5.0 |
| LAS | — | 2.0 | 2.0 | — | — | 2.0 |
| Zeolite A | — | 7.5 | 7.5 | 8.0 | — | 7.5 |
| Carbonate | — | 4.0 | 4.0 | 5.0 | — | 4.0 |
| PEG 4000 | — | 0.5 | 0.5 | — | — | 0.5 |
| Misc (water etc.) | — | 2.0 | 2.0 | 2.0 | — | 2.0 |
| Dry additives |  |  |  |  |  |  |
| QAS (I) | — | — | — | — | 1.0 | — |
| Citric acid | — | — | — | — | 2.0 | — |
| PB4 | — | — | — | — | 12.0 | 1.0 |
| PB1 | 4.0 | 1.0 | 3.0 | 2.0 | — | — |
| Percarbonate | — | — | — | — | 2.0 | 10.0 |
| Carbonate | — | 5.3 | 1.8 | — | 4.0 | 4.0 |
| NOBS | 4.0 | — | 6.0 | — | — | 0.6 |
| Methyl cellulose | 0.2 | — | — | — | — | — |
| SKS-6 | 8.0 | — | — | — | — | — |
| STS | — | — | 2.0 | — | 1.0 | — |
| Cumene sulfonic acid | — | 1.0 | — | — | — | 2.0 |
| Lipase | 0.2 | — | 0.2 | — | 0.2 | 0.4 |
| Cellulase | 0.2 | 0.2 | 0.2 | 0.3 | 0.2 | 0.2 |
| Amylase | 0.2 | — | 0.1 | — | 0.2 | — |
| Protease | 0.5 | 0.5 | 0.5 | 0.3 | 0.5 | 0.5 |
| PVPVI | — | — | — | — | 0.5 | 0.1 |
| PVP | — | — | — | — | 0.5 | — |
| PVNO | — | — | 0.5 | 0.3 | — | — |
| QEA | — | — | — | — | 1.0 | — |
| SRP1 | 0.2 | 0.5 | 0.3 | — | 0.2 | — |
| Silicone antifoam | 0.2 | 0.4 | 0.2 | 0.4 | 0.1 | — |
| Mg sulfate | — | — | 0.2 | — | 0.2 | — |
| Misc/minors to 100% |  |  |  |  |  |  |

(*) Glyoxylic compound as made in any one of Synthesis Examples I to XXIV.

EXAMPLE 5

The following nil bleach-containing detergent formulations of particular use in the washing of coloured clothing, according to the present invention were prepared:

|  | W | X | Y |
|---|---|---|---|
| Blown Powder |  |  |  |
| Zeolite A | 15.0 | 15.0 | — |
| Sulfate | 0.0 | 5.0 | — |
| LAS | 3.0 | 3.0 | — |
| DTPMP | 0.4 | 0.5 | — |
| CMC | 0.4 | 0.4 | — |
| MA/AA | 4.0 | 4.0 | — |
| Agglomerates |  |  |  |
| C45AS | — | — | 11.0 |
| LAS | 6.0 | 5.0 | — |
| TAS | 3.0 | 2.0 | — |
| Silicate | 4.0 | 4.0 | — |
| Zeolite A | 10.0 | 15.0 | 13.0 |
| CMC | — | — | 0.5 |
| MA/AA | — | — | 2.0 |
| Carbonate | 9.0 | 7.0 | 7.0 |
| Spray On |  |  |  |
| Perfume | 0.3 | 0.3 | 0.5 |
| Glyoxylic (*) | 0.3 | 0.3 | 0.5 |

-continued

|  | W | X | Y |
|---|---|---|---|
| C45E7 | 4.0 | 4.0 | 4.0 |
| C25E3 | 2.0 | 2.0 | 2.0 |
| Dry additives |  |  |  |
| MA/AA | — | — | 3.0 |
| NaSKS-6 | — | — | 12.0 |
| Citrate | 10.0 | — | 8.0 |
| Bicarbonate | 7.0 | 3.0 | 5.0 |
| Carbonate | 8.0 | 5.0 | 7.0 |
| PVPVI/PVNO | 0.5 | 0.5 | 0.5 |
| Alcalase | 0.5 | 0.3 | 0.9 |
| Lipase | 0.4 | 0.4 | 0.4 |
| Amylase | 0.6 | 0.6 | 0.6 |
| Cellulase | 0.6 | 0.6 | 0.6 |
| Silicone antifoam | 5.0 | 5.0 | 5.0 |
| Dry additives |  |  |  |
| Sulfate | 0.0 | 9.0 | 0.0 |
| Misc/minors to 100% | 100.0 | 100.0 | 100.0 |
| Density (g/liter) | 700 | 700 | 700 |

(*) Glyoxylic compound as made in any one of Synthesis Examples I to XXIV.

EXAMPLE 6

The following granular detergent formulations were prepared in accord with the invention.

|  | Z | AA | BB |
|---|---|---|---|
| Base granule |  |  |  |
| Zeolite A | 30.0 | 22.0 | 24.0 |
| Sulfate | 10.0 | 5.0 | 10.0 |
| MA/AA | 3.0 | — | — |
| AA | — | 1.6 | 2.0 |
| MA/AA (1) | — | 12.0 | — |
| LAS | 14.0 | 10.0 | 9.0 |
| C45AS | 8.0 | 7.0 | 9.0 |
| C45AES | — | 1.0 | 1.0 |
| Silicate | — | 1.0 | 0.5 |
| Soap | — | 2.0 | — |
| Brightener 1 | 0.2 | 0.2 | 0.2 |
| Carbonate | 6.0 | 9.0 | 10.0 |
| PEG 4000 | — | 1.0 | 1.5 |
| DTPA | — | 0.4 | — |
| Spray on |  |  |  |
| C25E9 | — | — | — |
| C45E7 | 1.0 | 1.0 | — |
| C23E9 | — | 1.0 | 2.5 |
| Perfume | 0.2 | 0.3 | 0.3 |
| Glyoxylic (*) | 0.2 | 0.3 | 0.3 |
| Dry additives |  |  |  |
| Carbonate | 5.0 | 10.0 | 18.0 |
| PVPVI/PVNO | 0.5 | — | 0.3 |
| Protease | 1.0 | 1.0 | 1.0 |
| Lipase | 0.4 | — | — |
| Amylase | 0.1 | — | — |
| Cellulase | 0.1 | 0.2 | 0.2 |
| NOBS | — | 4.0 | — |
| PB1 | 1.0 | 5.0 | 1.5 |
| Sulfate | 4.0 | 5.0 | — |
| SRPI | — | 0.4 | — |
| Sud supressor | — | 0.5 | 0.5 |
| Misc/minor to 100% |  |  |  |

(*) Glyoxylic compound as made in any one of Synthesis Examples I to XXIV.

EXAMPLE 7

The following granular detergent compositions were prepared in accord with the invention.

|  | CC | DD | EE |
| --- | --- | --- | --- |
| Blown powder |  |  |  |
| Zeolite A | 20.0 | — | 15.0 |
| STPP | — | 20.0 | — |
| Sulphate | — | — | 5.0 |
| Carbonate | — | — | 5.0 |
| TAS | — | — | 1.0 |
| LAS | 6.0 | 6.0 | 6.0 |
| C68AS | 2.0 | 2.0 | — |
| Silicate | 3.0 | 8.0 | — |
| MA/AA | 4.0 | 2.0 | 2.0 |
| CMC | 0.6 | 0.6 | 0.2 |
| Brightener 1 | 0.2 | 0.2 | 0.1 |
| DTPMP | 0.4 | 0.4 | 0.1 |
| STS | — | — | 1.0 |
| Spray on |  |  |  |
| C45E7 | 5.0 | 5.0 | 4.0 |
| Silicone antifoam | 0.3 | 0.3 | 0.1 |
| Perfume | 0.2 | 0.2 | 0.3 |
| Glyoxylic (*) | 0.2 | 0.2 | 0.3 |
| Dry additives |  |  |  |
| QEA | — | — | 1.0 |
| Carbonate | 14.0 | 9.0 | 10.0 |
| PBI | 1.5 | 2.0 | — |
| PB4 | 18.5 | 13.0 | 13.0 |
| TAED | 2.0 | 2.0 | 2.0 |
| QAS (I) | — | — | 1.0 |
| Photoactivated bleach | 15 ppm | 15 ppm | 15 ppm |
| SKS-6 | — | — | 3.0 |
| Protease | 1.0 | 1.0 | 0.2 |
| Lipase | 0.2 | 0.2 | 0.2 |
| Amylase | 0.4 | 0.4 | 0.2 |
| Cellulase | 0.1 | 0.1 | 0.2 |
| Sulfate | 10.0 | 20.0 | 5.0 |
| Misc/minors to 100% |  |  |  |
| Density (g/liter) | 700 | 700 | 700 |

(*) Glyoxylic compound as made in any one of Synthesis Examples I to XXIV.

EXAMPLE 8

The following detergent compositions, according to the present invention were prepared:

|  | FF | GG | HH |
| --- | --- | --- | --- |
| Blown Powder |  |  |  |
| Zeolite A | 15.0 | 15.0 | 15.0 |
| Sulfate | 0.0 | 5.0 | 0.0 |
| LAS | 3.0 | 3.0 | 3.0 |
| QAS | — | 1.5 | 1.5 |
| DTPMP | 0.4 | 0.2 | 0.4 |
| EDDS | — | 0.4 | 0.2 |
| CMC | 0.4 | 0.4 | 0.4 |
| MA/AA | 4.0 | 2.0 | 2.0 |
| Agglomerates |  |  |  |
| LAS | 5.0 | 5.0 | 5.0 |
| TAS | 2.0 | 2.0 | 1.0 |
| Silicate | 3.0 | 3.0 | 4.0 |
| Zeolite A | 8.0 | 8.0 | 8.0 |
| Carbonate | 8.0 | 8.0 | 4.0 |
| Spray On |  |  |  |
| Perfume | 0.3 | 0.3 | 0.3 |
| Glyoxylic (*) | 0.3 | 0.3 | 0.3 |
| C45E7 | 2.0 | 2.0 | 2.0 |
| C25E3 | 2.0 | — | — |
| Dry additives |  |  |  |
| Citrate | 5.0 | — | 2.0 |
| Bicarbonate | — | 3.0 | — |
| Carbonate | 8.0 | 15.0 | 10.0 |
| TAED | 6.0 | 2.0 | 5.0 |
| PB1 | 14.0 | 7.0 | 10.0 |
| PEO | — | — | 0.2 |
| Bentonite clay | — | — | 10.0 |
| Protease | 1.0 | 1.0 | 1.0 |
| Lipase | 0.4 | 0.4 | 0.4 |
| Amylase | 0.6 | 0.6 | 0.6 |
| Cellulase | 0.6 | 0.6 | 0.6 |
| Silicone antifoam | 5.0 | 5.0 | 5.0 |
| Dry additives |  |  |  |
| Sodium sulfate | 0.0 | 3.0 | 0.0 |
| Misc/minors to 100% | 100.0 | 100.0 | 100.0 |
| Density (g/liter) | 850 | 850 | 850 |

(*) Glyoxylic compound as made in any one of Synthesis Examples I to XXIV.

EXAMPLE 9

The following detergent formulations, according to the present invention were prepared:

|  | II | JJ | KK | LL |
| --- | --- | --- | --- | --- |
| LAS | 20.0 | 14.0 | 24.0 | 20.0 |
| QAS | 0.7 | 1.0 | — | 0.7 |
| TFAA | — | 1.0 | — | — |
| C23E56.5 | — | — | 1.0 | — |
| C45E7 | — | 1.0 | — | — |
| C45E3S | 1.0 | 2.5 | 1.0 | — |
| STPP | 36.0 | 18.0 | 30.0 | 22.0 |
| Silicate | 9.0 | 5.0 | 9.0 | 8.0 |
| Carbonate | 13.0 | 7.5 | 10.0 | 5.0 |
| Bicarbonate | — | 7.5 | — | — |
| PB1 | 3.0 | 1.0 | — | — |
| PB4 | — | 1.0 | — | — |
| NOBS | 2.0 | 1.0 | — | — |
| DTPMP | — | 1.0 | — | — |
| DTPA | 0.5 | — | 0.2 | 0.3 |
| SRP 1 | 0.3 | 0.2 | — | 0.1 |
| MA/AA | 1.0 | 1.5 | 2.0 | 0.5 |
| CMC | 0.8 | 0.4 | 0.4 | 0.2 |
| PEI | — | — | 0.4 | — |
| Sodium sulfate | 25.0 | 10.0 | 20.0 | 30.0 |
| Mg sulfate | 0.2 | — | 0.4 | 0.9 |
| Protease | 0.8 | 1.0 | 0.5 | 0.5 |
| Amylase | 0.5 | 0.4 | — | 0.25 |
| Lipase | 0.2 | — | 0.1 | — |
| Cellulase | 0.15 | — | — | 0.05 |
| Photoactivated bleach (ppm) | 30 ppm | 20 ppm | — | 10 ppm |
| Perfume | 0.3 | 0.3 | 0.1 | 0.2 |
| Glyoxylic (*) | 0.3 | 0.3 | 0.1 | 0.2 |
| Brightener ½ | 0.05 | 0.2 | 0.08 | 0.1 |
| Misc/minors to 100% |  |  |  |  |

(*) Glyoxylic compound as made in any one of Synthesis Examples I to XXIV.

EXAMPLE 10

The following liquid detergent formulations were prepared in accord with the invention (levels are given as parts per weight).

|  | MM | NN | OO | PP | QQ |
|---|---|---|---|---|---|
| LAS | 11.5 | 8.8 | — | 3.9 | — |
| C25E2.5S | — | 3.0 | 18.0 | — | 16.0 |
| C45E2.25S | 11.5 | 3.0 | — | 15.7 | — |
| C23E9 | — | 2.7 | 1.8 | 2.0 | 1.0 |
| C23E7 | 3.2 | — | — | — | — |
| CFAA | — | — | 5.2 | — | 3.1 |
| TPKFA | 1.6 | — | 2.0 | 0.5 | 2.0 |
| Citric acid (50%) | 6.5 | 1.2 | 2.5 | 4.4 | 2.5 |
| Calcium formate | 0.1 | 0.06 | 0.1 | — | — |
| Sodium formate | 0.5 | 0.06 | 0.1 | 0.05 | 0.05 |
| Sodium cumene sulfonate | 4.0 | 1.0 | 3.0 | 1.18 | — |
| Borate | 0.6 | — | 3.0 | 2.0 | 2.9 |
| Sodium hydroxide | 5.8 | 2.0 | 3.5 | 3.7 | 2.7 |
| Ethanol | 1.75 | 1.0 | 3.6 | 4.2 | 2.9 |
| 1,2 propanediol | 3.3 | 2.0 | 8.0 | 7.9 | 5.3 |
| Monoethanolamine | 3.0 | 1.5 | 1.3 | 2.5 | 0.8 |
| TEPAE | 1.6 | — | 1.3 | 1.2 | 1.2 |
| Protease | 1.0 | 0.3 | 1.0 | 0.5 | 0.7 |
| Lipase | — | — | 0.1 | — | — |
| Cellulase | — | — | 0.1 | 0.2 | 0.05 |
| Amylase | — | — | — | 0.1 | — |
| SRP1 | 0.2 | — | 0.1 | — | — |
| DTPA | — | — | 0.3 | — | — |
| PVNO | — | — | 0.3 | — | 0.2 |
| Brightener 1 | 0.2 | 0.07 | 0.1 | — | — |
| Silicone antifoam | 0.04 | 0.02 | 0.1 | 0.1 | 0.1 |
| Glyoxylic (*) | 0.04 | 0.02 | 0.1 | 0.1 | 0.1 |
| Water/minors |  |  |  |  |  |

(*) Glyoxylic compound as made in any one of Synthesis Examples I to XXIV.

EXAMPLE 11

The following liquid detergent formulations were prepared in accord with the invention (levels are given in parts per weight):

|  | RR | SS | TT | UU | VV |
|---|---|---|---|---|---|
| LAS | 10.0 | 13.0 | — | 25.0 | — |
| C25AS | 4.0 | 1.0 | 10.0 | — | 13.0 |
| C25E3S | 1.0 | — | 3.0 | — | 2.0 |
| C25E7 | 6.0 | 8.0 | 2.5 | — | — |
| TFAA | — | — | 4.5 | — | 6.0 |
| APA | — | 1.4 | — | 3.0 | 1.0 |
| TPKFA | 2.0 | — | 7.0 | — | 15.0 |
| Citric acid | 2.0 | 3.0 | 1.5 | 1.0 | 1.0 |
| Dodecenyl/tetradecenyl succinic acid | 12.0 | 10.0 | — | 15.0 | — |
| Rape seed fatty acid | 4.0 | 2.0 | — | 1.0 | — |
| Ethanol | 4.0 | 4.0 | 2.0 | 7.0 | 2.0 |
| 1,2 Propanediol | 4.0 | 4.0 | 7.0 | 6.0 | 8.0 |
| Monoethanolamine | — | — | 5.0 | — | — |
| Triethanotamine | — | — | — | — | — |
| TEPAE | 0.5 | — | 0.2 | — | — |
| DTPMP | 1.0 | 1.0 | 1.0 | 2.0 | 1.2 |
| Protease | 0.5 | 0.5 | 0.25 | — | 0.5 |
| Alcalase | — | — | — | 1.5 | — |
| Lipase | — | 0.10 | 0.01 | — | — |
| Amylase | 0.25 | 0.25 | 0.5 | 0.25 | 0.9 |
| Cellulase | — | — | 0.05 | — | — |
| Endolase | — | — | 0.10 | — | — |
| SRP2 | 0.3 | — | 0.1 | — | — |
| Boric acid | 0.1 | 0.2 | 2.0 | 1.0 | 1.5 |
| Calcium chloride | — | 0.02 | 0.01 | — | — |
| Bentonite clay | — | — | — | 4.0 | 4.0 |
| Brightener 1 | — | 0.4 | — | 0.1 | 0.2 |
| Sud supressor | 0.1 | 0.3 | 0.1 | 0.4 | — |
| Opacifier | 0.5 | 0.4 | 0.3 | 0.8 | 0.7 |
| Glyoxylic (*) | 0.5 | 0.4 | 0.3 | 0.8 | 0.7 |
| Water/minors to 100% |  |  |  |  |  |
| NaOH up to pH | 8.0 | 8.0 | 7.7 | 8.0 | 7.5 |

(*) Glyoxylic compound as made in any one of Synthesis Examples I to XXIV.

EXAMPLE 12

The following liquid detergent compositions were prepared in accord with the invention (levels are given in parts per weight).

|  | WW | XX |
|---|---|---|
| LAS | 27.6 | 18.9 |
| C45AS | 13.8 | 5.9 |
| C13E8 | 3.0 | 3.1 |
| Oleic acid | 3.4 | 2.5 |
| Citric acid | 5.4 | 5.4 |
| Sodium hydroxide | 0.4 | 3.6 |
| Calcium formate | 0.2 | 0.1 |
| Sodium formate | — | 0.5 |
| Ethanol | 7.0 | — |
| Monoethanolamine | 16.5 | 8.0 |
| 1,2 propanediol | 5.9 | 5.5 |
| Xylene sulfonic acid | — | 2.4 |
| TEPAE | 1.5 | 0.8 |
| Protease | 1.5 | 0.6 |
| PEG | — | 0.7 |
| Brightener 2 | 0.4 | 0.1 |
| Perfume | 0.5 | 0.3 |
| Glyoxylic (*) | 0.5 | 0.3 |
| Water/minors |  |  |

(*) Glyoxylic compound as made in any one of Synthesis Examples I to XXIV.

EXAMPLE 13

The following laundry bar detergent compositions were prepared in accord with the invention (levels are given in parts per weight).

|  | YY | ZZ | AB | AC | AD | AE |
|---|---|---|---|---|---|---|
| LAS | — | — | 19.0 | 15.0 | 21.0 | — |
| C28AS | 30.0 | 13.5 | — | — | — | 22.5 |
| Sodium laurate | 2.5 | 9.0 | — | — | — | — |
| Zeolite A | 2.0 | 1.25 | — | — | — | 1.25 |
| Carbonate | 20.0 | 3.0 | 13.0 | 8.0 | 10.0 | 10.0 |
| Calcium carbonate | 27.5 | 39.0 | 35.0 | — | — | 40.0 |
| Sulfate | 5.0 | 5.0 | 3.0 | 5.0 | 3.0 | 5.0 |
| TSPP | 5.0 | — | — | — | — | — |
| STPP | 5.0 | 15.0 | 10.0 | — | — | 10.0 |
| Bentonite clay | — | 10.0 | — | — | 5.0 | — |
| DTPMP | — | 0.7 | 0.6 | — | 0.6 | 0.7 |
| CMC | — | 1.0 | 1.0 | 1.0 | 1.0 | 1.0 |
| Talc | — | — | 10.0 | 15.0 | 10.0 | — |
| Silicate | — | — | 4.0 | 5.0 | 3.0 | — |
| PVNO | 0.02 | 0.03 | — | 0.01 | — | — |
| MA/AA | 0.4 | 1.0 | — | — | 0.2 | 0.4 |
| SRP1 | 0.3 | — | 0.3 | 0.3 | 0.3 | 0.3 |
| Protease | — | 0.12 | — | 0.08 | 0.08 | 0.1 |
| Lipase | — | 0.1 | — | 0.1 | — | — |
| Amylase | — | — | 0.8 | — | — | — |
| Cellulase | — | 0.15 | — | — | 0.15 | — |
| PEO | — | 0.2 | — | 0.2 | 0.3 | 0.3 |

-continued

|  | YY | ZZ | AB | AC | AD | AE |
|---|---|---|---|---|---|---|
| Perfume | 1.0 | 0.5 | 0.3 | 0.2 | 0.4 | 0.4 |
| Glyoxylic (*) | 1.0 | 0.5 | 0.3 | 0.2 | 0.4 | 0.4 |
| Mg sulfate | — | — | 3.0 | 3.0 | 3.0 | — |
| Brightener | 0.15 | 0.10 | 0.15 | — | — | 0.1 |
| Photoactivated bleach (ppm) | — | 15.0 | 15.0 | 15.0 | 15.0 | 15.0 |

(*) Glyoxylic compound as made in any one of Synthesis Examples I to XXIV.

EXAMPLE 14

The following fabric softening compositions are in accordance with the present invention, except for composition CC.

| Component | AF | AG | AH | AI | AJ | AK | CC |
|---|---|---|---|---|---|---|---|
| DTDMAC | — | — | — | — | 4.5 | 15.0 | — |
| DEQA | 2.6 | 2.9 | 18.0 | 19.0 | — | — | 18.0 |
| Fatty acid | 0.3 | — | 1.0 | — | — | — | — |
| Hydrochloride acid | 0.02 | 0.02 | 0.02 | 0.02 | 0.02 | 0.02 | 0.02 |
| PEG | — | — | 0.6 | 0.6 | — | 0.6 | — |
| Perfume | 1.0 | 1.0 | 1.0 | 1.0 | 1.0 | 1.0 | 1.0 |
| Silicone antifoam | 0.01 | 0.01 | 0.01 | 0.01 | 0.01 | 0.01 | 0.01 |
| Glyoxylic (*) | 0.4 | 0.6 | 0.8 | 0.8 | 0.6 | 0.8 | — |
| Electrolyte (ppm) | — | — | 600 | 1200 | — | 1200 | 800 |
| Dye (ppm) | 10 | 10 | 50 | 50 | 10 | 50 | 50 |
| Carezyme CEVU/g | — | — | — | 50 | — | — | — |
| PEI | — | — | — | — | — | — | 2.0 |
| SRP2 | — | — | — | — | — | — | 0.2 |
| Water and minors to balance to 100 | | | | | | | |

(*) Glyoxylic compound as made in any one of Synthesis Examples I to XXIV.

EXAMPLE 15

The following compositions for use as dryer-added sheets are in accordance with the invention

|  | AL | AM | AN | AO | AP | AQ |
|---|---|---|---|---|---|---|
| DOEQA | 40 | 25 | — | — | — | — |
| DHEQA | — | — | 20 | — | — | — |
| DTDMAMS | — | — | — | 20 | 12 | 60 |
| SDASA | 30 | 30 | 20 | 30 | 20 | — |
| Glycosperse S-20 | — | — | 10 | — | — | — |
| Glycerol Monostearate | — | — | — | 20 | 10 | — |
| Clay | 4 | 4 | 3 | 4 | 4 | — |
| Perfume | 0.7 | 1.1 | 0.7 | 1.6 | 2.6 | 1.4 |
| Glyoxylic (*) | 0.8 | 0.5 | 0.8 | 0.8 | 0.5 | 1.20 |
| Stearic acid to balance | | | | | | |

(*) Glyoxylic compound as made in any one of Synthesis Examples I to XXIV.

EXAMPLE 16

The following hard surface cleaning compositions AX to AZ are in accordance with the present invention

|  | AR | AS | AT |
|---|---|---|---|
| Dobanol 23-3 ® | 3.20 | 3.20 | 1.28 |
| Lutensol AO30 ® | 4.80 | 4.80 | 1.92 |
| Dobanol C7-11EO6 ® | 8.0 | 8.0 | 3.20 |
| Topped Palm kernal Fatty acid, Na salt | 0.80 | 0.80 | 0.40 |
| C8 Alkyl sulphate, Na salt | 2.0 | 2.0 | 0.8 |
| Parafin sulphonate, Na salt | 3.0 | 3.0 | 1.20 |
| Cumene sulphonate, Na salt | 3.0 | 3.0 | 1.20 |
| Perfume | 0.8 | 0.8 | 0.6 |
| Branched alcohol, Isofol 16 ® | — | — | 0.30 |
| Glyoxylic (*) | 1.86 | 2.49 | 0.6 |
| NaOH up to | pH 10 | pH 10 | pH 10 |
| Water and Minors up to 100% | | | |

(*) Glyoxylic compound as made in any one of Synthesis Examples I to XXIV.

EXAMPLE 17

The following dishwashing machine compositions according to the invention were prepared.

|  | AU | AV | AW | AX | AY | AZ | BA |
|---|---|---|---|---|---|---|---|
| Citrate | 15.0 | 15.0 | 15.0 | 15.0 | 15.0 | 15.0 | — |
| 480N | 6.0 | 6.0 | 6.0 | 6.0 | 6.0 | 6.0 | — |
| Carbonate | 17.5 | 17.5 | 17.5 | 17.5 | 17.5 | 17.5 | — |
| STPP | — | — | — | — | — | — | 38.0 |
| Silicate (as SiO$_2$) | 8.0 | 8.0 | 8.0 | 8.0 | 8.0 | 8.0 | 14.0 |
| Metasilicate (as SiO$_2$) | 1.2 | 1.2 | 1.2 | 1.2 | 1.2 | 1.2 | 2.5 |
| PB1 (AvO) | 1.2 | 1.2 | 1.5 | 1.5 | 1.5 | 2.2 | 1.2 |
| TAED | 2.2 | 2.2 | 2.2 | — | — | 2.2 | 2.2 |
| BzP | — | — | — | 0.8 | — | — | — |
| Cationic precursor | — | — | — | — | 3.3 | — | — |
| Paraffin | 0.5 | 0.5 | 0.5 | 0.5 | 0.5 | 0.5 | 0.5 |
| Bismuth nitrate | — | 0.2 | 0.2 | 0.2 | 0.3 | 0.4 | 0.2 |
| BD/MA | — | — | — | — | — | — | 0.5 |
| PMT | — | — | — | — | — | — | 0.5 |
| Protease | 0.04 | 0.04 | 0.04 | 0.04 | 0.04 | 0.04 | 0.04 |
| Amylase | 0.03 | 0.03 | 0.03 | 0.03 | 0.03 | 0.03 | — |
| BSA | — | — | — | — | — | — | 0.03 |
| DETPMP | 0.13 | 0.13 | 0.13 | 0.13 | 0.13 | 0.13 | — |
| HEDP | 1.0 | 1.0 | 1.0 | 1.0 | 1.0 | 1.0 | — |
| Nonionic | 2.0 | 2.0 | 2.0 | 2.0 | 2.0 | 2.0 | 1.5 |
| Glyoxylic (*) | 0.5 | 0.5 | 0.5 | 1.86 | 1.86 | 1.86 | 1.86 |
| Sulphate | 23.0 | 22.8 | 22.4 | 22.7 | 22.2 | 21.5 | 0.3 |
| misc inc Moisture to balance | | | | | | | |

(*) Glyoxylic compound as made in any one of Synthesis Examples I to XXIV.

What is claimed is:

1. A compound having the formula:

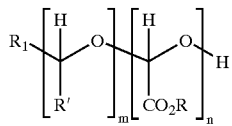

wherein:
a.) R is derived from a perfume alcohol selected from the group consisting of geraniol, citronellol, linalool, phenylethyl alcohol, undecavertol, majantol, rosalva, 1,2-dihydromyrcenol, and mixtures thereof;
b.) R' is derived from the organic chain of a perfume aldehyde selected from the group consisting of 1-octanal, 1-decanal, 1-dodecanal, methylnonyl acetaldehyde, trans-4-decenal, benzaldehyde, and mixture thereof;
c.) $R_1$ is selected from the group consisting of hydrogen, hydroxyl, alkyl, alkenyl, aryl, alkylaryl, —COOR$_3$, —CR$_4$R$_4$)$_q$COOR$_3$, —OR$_3$; wherein (i) $R_3$ is independently selected from the group consisting of hydrogen, alkali metals, ammonium, alkyl, alkenyl, aryl, alkylaryl, the alkyl chain of an active alcohol; and (ii) each $R_4$ is independently selected from the group consisting of hydrogen, hydroxyl, alkyl, alkenyl, aryl, alkylaryl, —$COOR_3$, —$CH_2COOR_3$, —$OR_3$; and (iii) q is from 0 to 10;

d.) m is an integer from 0 to 10,000; and e.) n is an integer having a value of at least 1.

2. A process for preparing a compound having the formula:

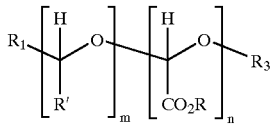

comprising the steps of:

a) reacting n equivalents of methyl glyoxylate with m equivalents of a perfume aldehyde having the formula R'CHO in the presence of a base, said base comprising the moiety $R_1$, said moiety $R_1$ being selected from the group consisting of hydrogen, hydroxyl, alkyl, alkenyl, aryl, alkylaryl, —$COOR_3$, —$(CR_4R_4)_qCOOR_3$, —$OR_3$ and mixtures thereof, to form a co-polymer having the formula:

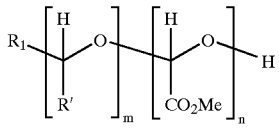

b) optionally capping said co-polymer with a capping unit having the formula $R_2$, said $R_2$ unit being selected from the group consisting of alkali metals, ammonium, alkyl, alkenyl, aryl, alkylaryl, and mixtures thereof, in the presence of an acid catalyst to form a co-polymer having the formula:

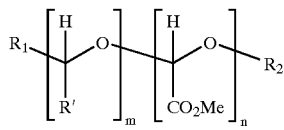

c) transesterifying said co-polymer with a perfume alcohol having the formula ROH in the presence of a base to form a co-polymer having the formula:

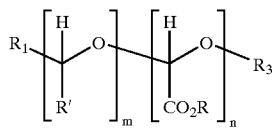

wherein $R_3$ is selected from the group consisting of hydrogen, alkali metals, ammonium, alkyl, alkenyl, aryl, alkylaryl, and mixtures thereof.

3. A process according to claim 2 wherein said base is selected from the group consisting of alkali metal alkoxide, dialkoxyacetates, dimethyl sodio methylmalonate, and mixtures thereof.

4. A process according to claim 2 wherein said capping unit $R_2$ is selected from the group consisting of alkali metals, ammonium, alkyl, alkenyl, aryl, alkylaryl, and mixtures thereof.

5. A process according to claim 4 wherein said $R_2$ unit is derived from ethyl vinyl ether.

6. A process according to claim 2 wherein said perfume alcohol of step (c) is selected from the group consisting of geraniol, citronellol, linalool, phenylethyl alcohol, undecavertol, majantol, rosalva, 1,2-dihydromyrcenol, and mixtures thereof.

7. A process according to claim 2 wherein said perfume aldehyde is selected from the group consisting of 1-octanal, 1-decanal, 1-dodecanal, methylnonyl acetaldehyde, trans-4-decenal, benzaldehyde, and mixtures thereof.

8. A process according to claim 2 wherein said acid catalyst is trifluoroacetic acid.

* * * * *